US012664756B2

(12) United States Patent
Panetta et al.

(10) Patent No.: US 12,664,756 B2
(45) Date of Patent: Jun. 23, 2026

(54) FUSION-BASED SENSING INTELLIGENCE AND REPORTING

(71) Applicants: Trustees of Tufts College, Medford, MA (US); Research Foundation of the City University of New York, New York, NY (US)

(72) Inventors: Karen A. Panetta, Rockport, MA (US); Sos S. Agaian, New York, NY (US); Aruna Ramesh, Lincoln, MA (US); Shishir Paramathma Rao, Burlington, MA (US); Shreyas Kamath Kalasa Mohandas, Burlington, MA (US); Srijith Rajeev, Burlington, MA (US); Rahul Rajendran, Belleville, MI (US)

(73) Assignees: Trustees of Tufts College, Medford, MA (US); Research Foundation of the City University of New York, New York, NY (US)

( * ) Notice: Subject to any disclaimer, the term of this patent is extended or adjusted under 35 U.S.C. 154(b) by 246 days.

(21) Appl. No.: 18/256,983

(22) PCT Filed: Dec. 17, 2021

(86) PCT No.: PCT/US2021/064000
§ 371 (c)(1),
(2) Date: Jun. 12, 2023

(87) PCT Pub. No.: WO2022/159214
PCT Pub. Date: Jul. 28, 2022

(65) Prior Publication Data
US 2024/0046612 A1 Feb. 8, 2024

Related U.S. Application Data

(60) Provisional application No. 63/127,140, filed on Dec. 17, 2020.

(51) Int. Cl.
| | |
|---|---|
| *G06V 10/764* | (2022.01) |
| *G06T 7/70* | (2017.01) |
| *G06V 40/18* | (2022.01) |

(52) U.S. Cl.
CPC .............. *G06V 10/764* (2022.01); *G06T 7/70* (2017.01); *G06V 40/18* (2022.01); *G06T 2207/10048* (2013.01); *G06T 2207/30204* (2013.01)

(58) Field of Classification Search
CPC ........ G06V 10/764; G06V 40/18; G06T 7/70; G06T 2207/10048; G06T 2207/30204;
(Continued)

(56) References Cited

U.S. PATENT DOCUMENTS

| | | |
|---|---|---|
| 7,039,232 B2 | 5/2006 | Nagarajan et al. |
| 7,203,360 B2 | 4/2007 | Lee et al. |
| | (Continued) | |

FOREIGN PATENT DOCUMENTS

| | | |
|---|---|---|
| CN | 203202640 U | 9/2013 |
| WO | WO 2021/062366 A1 | 4/2021 |

OTHER PUBLICATIONS

Baltrusaitis et al., "Multimodal Machine Learning: A Survey and Taxonomy;" Proceedings of the IEEE Transactions on Pattern Analysis and Machine Intelligence, vol. 41, Issue 2; Feb. 1, 2019; pp. 423-443; 20 Pages.

(Continued)

*Primary Examiner* — Vu Le
*Assistant Examiner* — Lei Zhao
(74) *Attorney, Agent, or Firm* — DALY, CROWLEY, MOFFORD & DURKEE, LLP

(57) ABSTRACT

A method comprising: obtaining a plurality of data sets, each of the plurality of data sets being generated, at least in part, by using by a different one of a plurality of sensors, each of
(Continued)

a plurality of sensors including a wearable sensor that is worn by a user or a sensor that is positioned at a same location as the user; combining the plurality of data sets to produce a fused data set; processing the fused data set to identify at least one of a performance of the user in completing a task, a cognitive load of the user, and/or one or more objects that are positioned at the same location as the user; and outputting an indication of a state of the user based on an outcome of the processing.

17 Claims, 30 Drawing Sheets

(58) Field of Classification Search
CPC ....... G06T 2200/24; G06T 2207/10016; G06T 2207/10024; G06T 2207/20081; G06T 2207/20084; G06T 2207/30232; G06T 7/0004
See application file for complete search history.

(56) References Cited

U.S. PATENT DOCUMENTS

| | | | |
|---|---|---|---|
| 7,358,889 B2 | 4/2008 | Abe et al. | |
| 7,777,669 B2 | 8/2010 | Tokoro et al. | |
| 7,933,454 B2 | 4/2011 | Bressan et al. | |
| 8,422,775 B2 | 4/2013 | Wang et al. | |
| 8,478,052 B1 | 7/2013 | Yee et al. | |
| 8,526,728 B2 | 9/2013 | Kang et al. | |
| 8,559,670 B2 | 10/2013 | Wang et al. | |
| 8,577,156 B2 | 11/2013 | Stankiewicz et al. | |
| 8,682,074 B2 | 3/2014 | Boettger | |
| 8,755,623 B2 | 6/2014 | Du | |
| 8,805,058 B2 | 8/2014 | Zebedin | |
| 8,824,833 B2 | 9/2014 | Dagher et al. | |
| 9,053,558 B2 | 6/2015 | Shen | |
| 9,165,377 B2 | 10/2015 | Shibazaki | |
| 9,165,390 B2 | 10/2015 | Matsumoto | |
| 9,247,408 B2 | 1/2016 | South | |
| 9,342,758 B2 | 5/2016 | Xue | |
| 9,661,298 B2 | 5/2017 | Liu et al. | |
| 9,704,066 B2 | 7/2017 | Zhu et al. | |
| 9,736,580 B2 | 8/2017 | Cahill et al. | |
| 9,805,264 B2 | 10/2017 | Kuznetsova et al. | |
| 9,911,340 B2 | 3/2018 | Samarasekera et al. | |
| 10,373,380 B2 | 8/2019 | Kutliroff et al. | |
| 10,417,497 B1 * | 9/2019 | Cossman | G06F 3/04817 |
| 10,458,807 B2 | 10/2019 | Kreter et al. | |
| 10,552,705 B2 | 2/2020 | He et al. | |
| 2005/0177350 A1 | 8/2005 | Kishikawa | |
| 2007/0242872 A1 | 10/2007 | Rudin et al. | |
| 2009/0237396 A1 | 9/2009 | Venezia et al. | |
| 2015/0206329 A1 | 7/2015 | Devries | |
| 2016/0203726 A1 | 7/2016 | Hibbs et al. | |
| 2017/0174227 A1 | 6/2017 | Tatourian et al. | |
| 2019/0012549 A1 | 1/2019 | Zheng et al. | |
| 2019/0121343 A1 | 4/2019 | Cella et al. | |
| 2019/0176841 A1 * | 6/2019 | England | G01S 7/4026 |
| 2019/0362557 A1 * | 11/2019 | Lacey | G06T 5/20 |
| 2020/0118460 A1 | 4/2020 | Lehari | |

OTHER PUBLICATIONS

PCT International Search Report and Written Opinion dated Aug. 24, 2022 for International Application No. PCT/US2021/064000; 16 Pages.
PCT International Search Report and Written Opinion dated Jun. 29, 2023 for International Application No. PCT/US2021/064000; 13 Pages.
Alam et al., "Data Fusion and IoT for Smart Ubiquitous Environments: A Survey;" Published in IEEE Access, vol. 5; Published Apr. 25, 2017; 22 Pages.

Bahnsen et al., "Rain Removal in Traffic Surveillance: Does it Matter?;" IEEE Transactions on Intelligent Transportation Systems; Submitted Oct. 30, 2018; 18 Pages.
Bailey et al., "Simultaneous Localisation and Mapping (SLAM): Part II State of the Art;" Proceedings of the IEEE Robotics & Automation Magazine, vol. 13, Issue 3; Sep. 2006; 10 Pages.
Chen et al., "De-smokeGCN: Generative Cooperative Networks for Joint Surgical Smoke Detection and Removal;" IEEE Transactions on Medical Imaging, vol. 39, No. 5; May 2020; 11 Pages.
Corrado et al., "Data Fusion and Unmanned Aerial Vehicles (UAVs) for First Responders;" 2017 IEEE International Symposium Technologies for Homeland Security (HST); Apr. 25, 2017; 6 Pages.
Davison et al., "Real-Time 3D Slam with Wide-Angle Vision;" $5^{th}$ IFAC/EURON Symposium on Intelligent Autonomous Vehicles; Jul. 5, 2004; 6 Pages.
Gao et al., "A Survey on Deep Learning for Multimodal Data Fusion;" Neural Computation, No. 32; May 1, 2020; pp. 829-864; 36 Pages.
Girshick, "Fast R-CNN;" Proceedings of ICCV 2020; Jun. 23, 2020; 9 Pages.
Guo et al., "LIME: Low-Light Image Enhancement Via Illumination Map Estimation;" IEEE Transactions on Image Processing; Accepted Dec. 3, 2016; 12 Pages.
Hall et al., "An Introduction to Multisensor Data Fusion;" Invited Paper; Proceedings of the IEEE, vol. 85, Issue 1; Jan. 1997; 19 Pages.
He et al., "Deep Residual Learning for Image Recognition;" 2016 IEEE Conference on Computer Vision and Pattern Recognition (CVPR); Jun. 27, 2016; 13 Pages.
He et al., "Mask R-CNN;" 2017 IEEE International Conference on Computer Vision (ICCV); Oct. 22, 2017; 12 Pages.
Itti et al., "A Model of Saliency-Based Visual Attention for Rapid Scene Analysis;" IEEE Transactions on Pattern Analysis and Machine Intelligence, vol. 20, Issue 11; Nov. 1998; pp. 1254-1259; 6 Pages.
Jiang et al., "FastDeRain: A Novel Video Rain Streak Removal Method Using Directional Gradient Priors;" IEEE Transactions on Image Processing, vol. 28, No. 4; Apr. 2019; 14 Pages.
Kanezaki et al., "Deep Learning for Multimodal Data Fusion;" Chapter 2 from the book *Multimodal Scene Understanding*; Jan. 2019; pp. 9-39; 31 Pages.
Lahat et al., "Multimodal Data Fusion: An Overview of Methods, Challenges and Prospects;" Proceedings of the IEEE, vol. 103, Issue 9; Sep. 2015; 27 Pages.
Liu et al., "DesnowNet: Context-Aware Deep Network for Snow Removal;" IEEE Transactions on Image Processing, vol. 27, Issue 6; Jun. 2018; pp. 3064-3073; 12 Pages.
Liu et al., "Urban Big Data Fusion Based on Deep Learning: An Overview;" Article from Information Fusion, No. 53; Accepted Jun. 9, 2019; pp. 123-133; 11 Pages.
Moreira et al., "Multimodal Data Fusion for Sensitive Scene Localization;" Article in *Information Fusion*; Mar. 5, 2018; 40 Pages.
Nercessian et al., "Multiresolution Decomposition Schemes Using the Parameterized Logarithmic Image Processing Model with Application to Image Fusion;" Research Article from EURASIP Journal on Advances in Signal Processing, vol. 2011; Accepted Oct. 7, 2010; 17 Pages.
Panetta et al., "Color Theme-Based Aesthetic Enhancement Algorithm to Emulate the Human Perception of Beauty in Photos;" Proceedings of ACM Transactions on Multimedia Computing, Communications, and Applications, vol. 15, Issue 2s; Article 62; Published Jul. 3, 2019; 17 Pages.
Rajeev et al., "Augmented Reality-Based Vision-Aid Indoor Navigation System in GPS Denied Environment;" Proceedings of SPIE Defense + Commercial Sensing 10993, Mobile Multimedia/Image Processing, Security, and Applications; May 13, 2019; 11 Pages.
Rosebrock, "Deep Learning for Computer Vision with Python;" ImageNet Bundle, $3^{rd}$ Edition; Third Printing, Nov. 2019; Part 1 of 5; 75 Pages.
Rosebrock, "Deep Learning for Computer Vision with Python;" ImageNet Bundle, $3^{rd}$ Edition; Third Printing, Nov. 2019; Part 2 of 5; 75 Pages.

(56)     References Cited

OTHER PUBLICATIONS

Rosebrock, "Deep Learning for Computer Vision with Python;" ImageNet Bundle, $3^{rd}$ Edition; Third Printing, Nov. 2019; Part 3 of 5; 80 Pages.

Rosebrock, "Deep Learning for Computer Vision with Python;" ImageNet Bundle, $3^{rd}$ Edition; Third Printing, Nov. 2019; Part 4 of 5; 70 Pages.

Rosebrock, "Deep Learning for Computer Vision with Python;" ImageNet Bundle, $3^{rd}$ Edition; Third Printing, Nov. 2019; Part 5 of 5; 22 Pages.

Singh et al., "Image Understanding—A Brief Review of Scene Classification and Recognition;" Proceedings of MAICS; Mar. 2017; 7 Pages.

Szegedy et al., "Going Deeper with Convolutions;" 2015 IEEE Conference on Computer Vision and Pattern Recognition (CVPR); Submitted on Sep. 17, 2014; 13 Pages.

Viola et al., "Rapid Object Detection Using a Boosted Cascade of Simple Features;" Accepted Conference on Computer Vision and Pattern Recognition (CVPR); Dec. 8, 2001; 9 Pages.

Wan et al., "ARNature: Augmented Reality Style Colorization for Enhancing Tourism Experience;" Proceedings of SPIE Defense + Commercial Sensing 10993; Mobile Multimedia/Image Processing, Security, and Applications; May 13, 2019; 11 Pages.

Wang et al., "Action Recognition Using Nonnegative Action Component Representation and Sparse Basis Selection;" IEEE Transactions on Image Processing, vol. 23, No. 2; Feb. 2014; 12 Pages.

Wojek et al., "Monocular Visual Scene Understanding: Understanding Multi-Object Traffic Scenes;" IEEE Transactions on Pattern Analysis and Machine Intelligence, vol. 35, Issue 4; Apr. 2013; 18 Pages.

Yang et al., "Train and Equip Firefighters with Cognitive Virtual and Augmented Reality;" 2018 IEEE $4^{th}$ International Conference on Collaboration and Internet Computing (CIC); Oct. 18, 2018; 7 Pages.

Yeh et al., "Multi-Scale Deep Residual Learning-Based Single Image Haze Removal via Image Decomposition;" IEEE Transactions on Image Processing, vol. 29; Published Dec. 11, 2019; 15 Pages.

Zhang et al., "Convolutional Sparse and Low-Rank Coding-Based Rain Streak Removal;" 2017 IEEE Winter Conference on Applications of Computer Vision (WACV); Mar. 24, 2017; 11 Pages.

Zhao et al., "Removal of Dynamic Weather Conditions Based on Variable Time Window;" Published in IET Computer Vision, vol. 7, Issue 4; Accepted on Mar. 4, 2013; pp. 219-226; 8 Pages.

* cited by examiner

CENTRAL PROCESSING SYSTEM

110

506

TRANSCEIVER

504C

INERTIAL TRACKING
SENSOR

504D

HEALTH SENSORS

502

PROCESSOR

501

504B

AUDIO SENSOR

504A

THERMAL AND
VISUAL SENSORS
(CAMERAS)

MULTI-SENSOR
INFO CAPTURE

3D DATA
CAPTURE

AUDIO INFORMATION
CAPTURE

ARTIFICIAL INTELLIGENCE

COMPUTER VISION
PROCESSING

DYMANIC MAPPING AND PERSONAL
LOCALIZATION AND TRACKING
702

MULTI-MODAL SCENE ANALYSIS
704

STRUCTURAL HAZARD DETECTION
706

HAZARDOUS GAS DETECTION
708

HISTORICAL DATA STORAGE

INSTANT CAPTURE DATA

CENTRAL PROCESSING SYSTEM 110

DIFFERENT DATA MODALITIES MULTIPLE DATA CHANNELS

INPUT DATA

HUMAN PERFORMANCE MONITOR DEVICE

OUTPUT DATA

COGNTITION ANALYTICS AND MASUREMENTS

Data Fusion System and Architecture for Cognitive Science

900

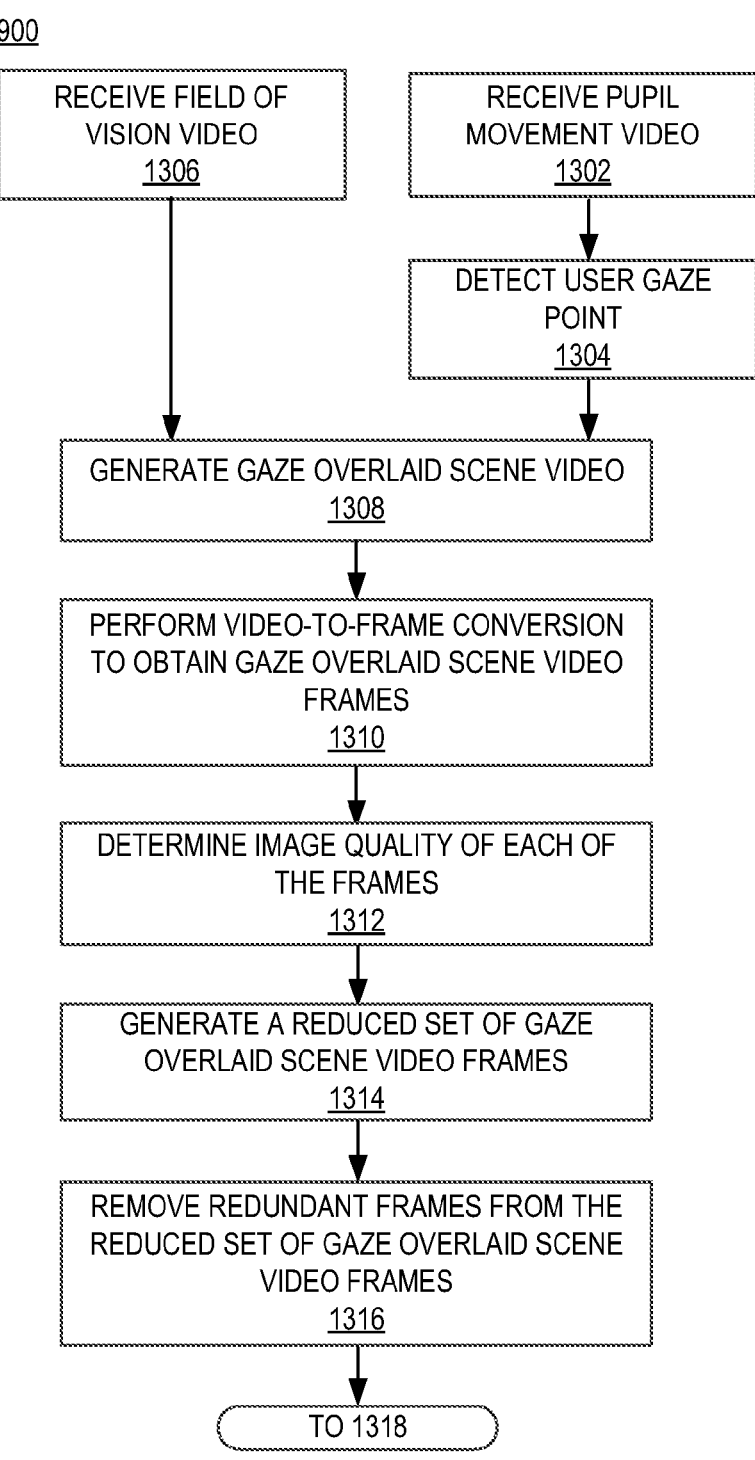

RECEIVE FIELD OF
VISION VIDEO
1306

RECEIVE PUPIL
MOVEMENT VIDEO
1302

DETECT USER GAZE
POINT
1304

GENERATE GAZE OVERLAID SCENE VIDEO
1308

PERFORM VIDEO-TO-FRAME CONVERSION
TO OBTAIN GAZE OVERLAID SCENE VIDEO
FRAMES
1310

DETERMINE IMAGE QUALITY OF EACH OF
THE FRAMES
1312

GENERATE A REDUCED SET OF GAZE
OVERLAID SCENE VIDEO FRAMES
1314

REMOVE REDUNDANT FRAMES FROM THE
REDUCED SET OF GAZE OVERLAID SCENE
VIDEO FRAMES
1316

POSSIBLY
DAMAGED CAR

FUSION-BASED SENSING INTELLIGENCE AND REPORTING

CROSS-REFERENCE TO RELATED APPLICATIONS

The present application is a national stage filing under 35 U.S.C. § 371 of PCT Application No. PCT/US2021/064000 filed on Dec. 17, 2021 which claims the benefit of U.S. Provisional Patent Application No. 63/127,140, filed on Dec. 17, 2020, which is incorporated herein by reference.

STATEMENT OF FEDERALLY SPONSORED RESEARCH

This invention was made with government support under grant W911QY-15-2-0001 awarded by the United States Army and grant 2019-R2-CX-0036 awarded by the United States Department of Justice. The government has certain rights in the invention.

BACKGROUND

Artificial Intelligence (AI) is the foundation for scene analysis and detection. Data and AI have a synergistic relationship, where data is impenetrable without AI, and diverse data sets allow AI methods to thrive. Researchers and AI developers require datasets and testbeds to train and test AI on real-world data. Although data exists in multiple modalities, most of the current AI systems focus on one type of data modality. AI models are trained on data that are captured in ideal conditions. For instance, algorithms may operate effectively in bright daylight when the sensor can see the objects clearly but may not work well in low light or adverse weather circumstances, including rain, snow, haze, and fog. To solve the challenges above, these systems must utilize multi-modal data and perform automatic multi-modal homogeneous and heterogeneous data fusion.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

According to aspects of the disclosure, a method comprising: obtaining a plurality of data sets, each of the plurality of data sets being generated, at least in part, by using by a different one of a plurality of sensors, each of a plurality of sensors including a wearable sensor that is worn by a user or a sensor that is positioned at a same location as the user; combining the plurality of data sets to produce a fused data set; processing the fused data set to identify at least one of a performance of the user in completing a task, a cognitive load of the user, and/or one or more objects that are positioned at the same location as the user; and outputting an indication of a state of the user based on an outcome of the processing.

According to aspects of the disclosure, a system is provided, comprising: a memory; and a processing circuitry that is operatively coupled to the memory, the processing circuitry being configured to perform the operations of: obtaining a plurality of data sets, each of the plurality of data sets being generated, at least in part, by using by a different one of a plurality of sensors, each of a plurality of sensors including a wearable sensor that is worn by a user or a sensor that is positioned at a same location as the user; combining the plurality of data sets to produce a fused data set; processing the fused data set to identify at least one of a performance of the user in completing a task, a cognitive load of the user, and/or one or more objects that are positioned at the same location as the user; and outputting an indication of a state of the user based on an outcome of the processing.

According to aspects of the disclosure, a non-transitory computer-readable medium is provided that stores one or more processor-executable instructions, which when executed by at least one processor, cause at least one processor to perform the operations of: obtaining a plurality of data sets, each of the plurality of data sets being generated, at least in part, by using by a different one of a plurality of sensors, each of a plurality of sensors including a wearable sensor that is worn by a user or a sensor that is positioned at a same location as the user; combining the plurality of data sets to produce a fused data set; processing the fused data set to identify at least one of a performance of the user in completing a task, a cognitive load of the user, and/or one or more objects that are positioned at the same location as the user; and outputting an indication of a state of the user based on an outcome of the processing.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 3 is a diagram of an example of a reseller prevention module, according to aspects of the disclosure;

FIG. 13A is a flowchart of an example of a process, according to aspects of the disclosure;

DETAILED DESCRIPTION

Figure 1:
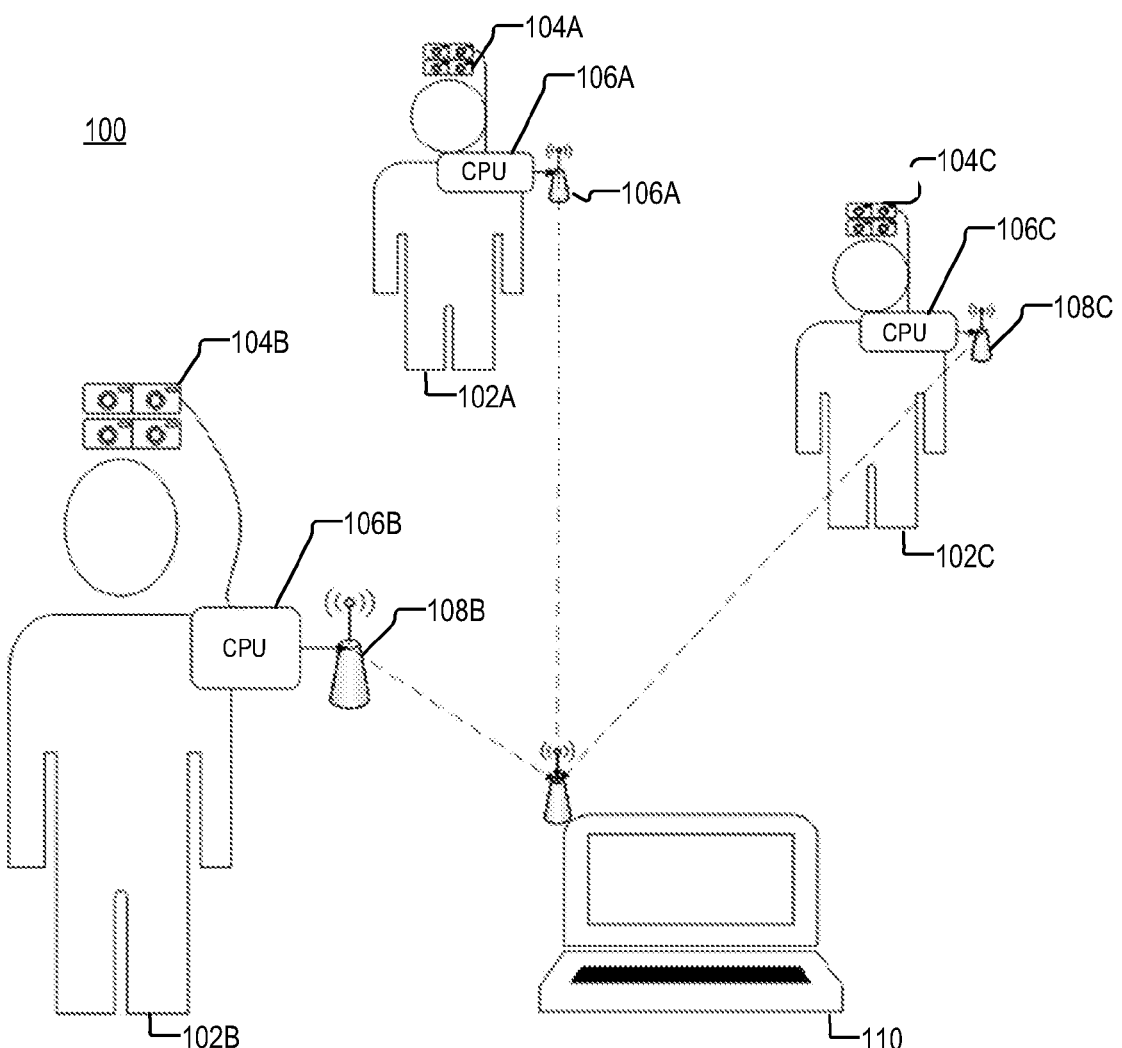
FIG. 1 is a diagram of an example of a system, according to aspects of the disclosure.

Modern computer vision relies on deep learning, a specific subset of machine learning, which uses algorithms to glean insights from data. Computer vision is a branch of computer science that focuses on developing digital systems capable of processing, analyzing, and making sense of visual input (images or videos) in the same way that people do. The concept of computer vision is centered on teaching computers to analyze and understand images at the pixel level. Fundamentally, machines use sophisticated software algorithms to retrieve visual input, process it, and interpret the results.

Deep learning is a more efficient method of performing computer vision because it employs a specific algorithm known as a neural network. Neural networks are used to extract patterns from data samples presented. The algorithms are based on human understanding of how brains work, namely the interconnections between neurons in the cerebral cortex.

In first responder and military technological applications, data analytic techniques may be used to improve vision, classification, and scene analysis systems that may lead to lower injuries/casualties, faster response, and a better understanding of the situation. In real-estate investment and banking, automated acquisition, processing, and reporting systems can lead to faster production. This technique may allow better performance, confidence, and transparency in the field. AI fused with human expertise can increase accuracy, efficiency, and data-crunching power.

In automobile navigation systems, both automated and manual, multi-modal analytic systems may lead to an improvement of AI systems, better analysis, and visualization of data in abnormal and normal conditions. Abnormal conditions may include, but are not limited to, rain, haze, snow, smoke, low light, and damaged roadways or automobiles.

Data fusion, enhancement, classification, segmentation, detection, and scene analysis are the key founding pillars of computer vision and AI. Various applications can be divided into several sub techniques, which include, but are not limited to, enhancement, multi-modal data fusion, classification, segmentation, detection, recognition, scene analysis, and mixed-reality visualization.

Data Fusion. Examples of techniques for data fusion are disclosed U.S. Pat. Nos. 8,824,833, 8,805,058, 20090237396A1, 20070242872, 20050177350, and 9053558. The source of data for these techniques can be a single sensor, identical sensors, same class of sensors, or different class of sensors. In practice, however, such known multi-modal data algorithms are limited to fusing images from only a few modalities.

Additional methods of multi-modal data fusion are described by: Nercessian (Nercessian, Shahan C., Karen A. Panetta, and Sos S. Agaian. "Multiresolution decomposition schemes using the parameterized logarithmic image processing model with application to image fusion." EURASIP Journal on Advances in Signal Processing 2011.1 (2011): 515084); Lahat (Lahat, Dana, lay Adali, and Christian Jutten. "Multi-modal data fusion: an overview of methods, challenges, and prospects." Proceedings of the IEEE 103.9 (2015): 1449-1477); Liu (Liu, Jia, et al. "Urban big data fusion based on deep learning: An overview." Information Fusion 53 (2020): 123-133), Kanezaki (Kanezaki, Asako, et al. "Deep learning for multi-modal data fusion." Multimodal Scene Understanding. Academic Press, 2019. 9-39); Moreira (Moreira, Daniel, et al. "Multi-modal data fusion for sensitive scene localization." Information Fusion 45 (2019): 307-323); Gao (Gao, Jing, et al. "A Survey on Deep Learning for Multimodal Data Fusion." Neural Computation 32.5 (2020): 829-864); Corrado (Corrado, Casey, and Karen Panetta. "Data fusion and unmanned aerial vehicles (UAVs) for first responders." 2017 IEEE international symposium on technologies for homeland security (HST). IEEE, 2017.); Bailey (Bailey, Tim, and Hugh Durrant-Whyte. "Simultaneous localization and mapping (SLAM): Part II." IEEE robotics & automation magazine 13.3 (2006): 108-117); Davison (Davison, Andrew J., Yolanda Gonzalez Cid, and Nobuyuki Kita. "Real-time 3D SLAM with wide-angle vision." IFAC Proceedings Volumes 37.8 (2004): 868-873); and Hall (Hall, David L., and James Llinas. "An introduction to multisensor data fusion." Proceedings of the IEEE 85.1 (1997): 6-23), and Alam (Alam, Funian, et al. "Data fusion and IoT for smart ubiquitous environments: a survey." IEEE Access 5 (2017): 9533-9554).

Enhancement. Various enhancement techniques are known for enhancing images. which are obscured by background, environmental, and sensor anomalies. For example, there are many known methods for enhancing, such as described in U.S. Pat. Nos. 8,755,623, 8,526,728, 7,933,454, and 9,661,298. However, a major problem in state-of-the-art enhancement techniques is enhancing the visibility of data in unfavorable conditions. These conditions may include weather conditions such as rain, fog, haze, snow, floods, or low light, or due to man-made conditions such as smoke, fire, or low-lit rooms.

Additional methods of multi-modal enhancement are described by: Guo, Xiaojie, Yu Li, and Haibin Ling. "LIME: Low-light image enhancement via illumination map estimation." IEEE Transactions on Image Processing 26.2 (2016): 982-993; Panetta (Panetta, Karen, et al., eds. "Color Theme-based Aesthetic Enhancement Algorithm to Emulate the Human Perception of Beauty in Photos." ACM Transactions on Multimedia Computing, Communications, and Applications (TOMM) 15.2s (2019): 1-17); Bahnsen (Bahnsen, Chris H., and Thomas B. Moeslund. "Rain removal in traffic surveillance: Does it matter?." IEEE Transactions on Intelligent Transportation Systems 20.8 (2018): 2802-2819); Zhang (Zhang, He, and Vishal M. Patel. "Convolutional sparse and low-rank coding-based rain streak removal." 2017 IEEE Winter Conference on Applications of Computer Vision (WACV). IEEE, 2017); Jiang (Jiang, Tai-Xiang, et al. "Fastderain: A novel video rain streak removal method using directional gradient priors." IEEE Transactions on Image Processing 28.4 (2018): 2089-2102); Liu (Liu, Yun-Fu, et al. "DesnowNet: Context-aware deep network for snow removal." IEEE Transactions on Image Processing 27.6 (2018): 3064-3073); Zhao (Zhao, Xudong, et al. "Removal of dynamic weather conditions based on variable time window." IET Computer Vision 7.4 (2013): 219-226); Chen (Chen, Long, et al. "De-smokeGCN: Generative Cooperative Networks for Joint Surgical Smoke Detection and Removal." IEEE transactions on medical imaging (2019)); Yeh (Yeh, Chia-Hung, Chih-Hsiang Huang, and Li-Wei Kang. "Multi-Scale Deep Residual Learning-Based Single Image Haze Removal via Image Decomposition." IEEE Transactions on Image Processing (2019))

Classification, segmentation, and detection. Various computer vision and neural network-based techniques exist for the classification, segmentation, and object detection and recognition. For example, U.S. Pat. Nos. 9,342,758, 8,478,052, and 9,704,066 all of which are incorporated herein by reference are known art for classification. U.S. Pat. No. 7,203,360, 10,552,705, 7,039,232, 8,682,074, and 8,422,775 all of which are incorporated herein by reference are known art for segmentation. U.S. Pat. Nos. 9,165,390, 7,777,669, 7,358,889, 8,559,670, and 9,805,264 all of which are incorporated herein by reference are known art for object detection. However, such techniques are limited to processing of homogeneous systems only.

Additional methods of classification, segmentation, and detection are described by Viola (Viola, Paul, and Michael Jones. "Rapid object detection using a boosted cascade of simple features." Proceedings of the 2001 IEEE computer society conference on computer vision and pattern recognition. CVPR 2001. Vol. 1. IEEE, 2001), Rosebrock (Rosebrock, Adrian. *Deep Learning for Computer Vision with Python: linageNet Bundle*. PyimageSearch, 2017); Szegedy (Szegedy, Christian, et al. "Going deeper with convolutions." Proceedings of the IEEE conference on computer vision and pattern recognition. 2015), Girshick (Girshick, Ross. "Fast r-cnn." Proceedings of the IEEE international conference on computer vision. 2015); He (He, Kaiming, et al. "Deep residual learning for image recognition." Proceedings of the IEEE conference on computer vision and pattern recognition. 2016); Wang (Wang, Haoran, et al. "Action recognition using nonnegative action component representation and sparse basis selection." IEEE transactions on image processing 23.2 (2013): 570-581); and He (He, Kaiming, et al. "Mask r-cnn." Proceedings of the IEEE international conference on computer vision. 2017).

Scene analysis. Scene analysis is a very important technique widely used in automatic navigation systems. Scene analysis typically involves inferring the context of a scene. For example, U.S. Pat. Nos. 20190012549, 8,577,156, 9,165,377, 9,736,580B2, 9,911,340, 10,373,380, and 20190012549A1 all of which are incorporated herein by reference. However, scene analysis techniques are typically developed for homogeneous systems and require a significant length of time to process. There is a lack of methods and systems to perform in-depth scene analysis by utilizing multiple modalities of data such as visible, thermal, X-ray, voice, eye-trackers, text, and wearable sensors to name a few.

Additional methods of scene analysis are described by Wojek (Wojek, Christian, et al. "Monocular visual scene understanding: Understanding multi-object traffic scenes." IEEE transactions on pattern analysis and machine intelligence 35.4 (2012): 882-897); Itti (Itti, Laurent, Christof Koch, and Ernst Niebur. "A model of saliency-based visual attention for rapid scene analysis." IEEE Transactions on pattern analysis and machine intelligence 20.11 (1998): 1254-1259); and Singh (Singh, Vineeta, Deeptha Girish, and Anca Ralescu. "Image Understanding-a Brief Review of Scene Classification and Recognition." MAICS. 2017).

Generally, mixed reality (MR) refers to a combination of virtual and real environments to produce new environments and visualizations, where physical and digital objects co-exist and interact in real-time. For example, U.S. Pat. Nos. 10,417,497, 10,458,807, 20150206329, and 9,247,408 all of which are incorporated herein by reference.

Mixed Reality. Mixed reality (MR) applications rely heavily on computer vision. This technology enables MR applications to detect physical things in real-time (both surfaces and individual objects inside a particular physical location) and utilize that knowledge to position virtual objects within the physical world. Additional methods of MR visualization are described by Wan (Wan, Qianwen, et al. "ARNature: augmented reality style colorization for enhancing tourism experience." Mobile Multimedia/Image Processing, Security, and Applications 2019. Vol. 10993. International Society for Optics and Photonics, 2019), Rajeev (Rajeev, Srijith, et al. "Augmented reality-based vision-aid indoor navigation system in GPS denied environment." Mobile Multimedia/Image Processing, Security, and Applications 2019. Vol. 10993. International Society for Optics and Photonics, 2019), Yang (Yang, Li, et al. "Train and Equip Firefighters with Cognitive Virtual and Augmented Reality." 2018 IEEE 4th International Conference on Collaboration and Internet Computing (CIC). IEEE, 2018).

Section 1

In one aspect of the disclosure, systems and methods for multi-modal data enhancement are provided, which take advantage of what is herein called a ClearVision enhancement technique. Visible spectrum images are susceptible to lighting conditions and become invalid in total darkness. Furthermore, their imaging quality decreases significantly in adverse environmental conditions, such as rain and fog. The ClearVision enhancement technique may be applied to single data modalities or a combination of data modalities to provide enhanced images. Regarding imaging modalities, the enhancement techniques may be applied to improve characteristics of images that include, but are not limited to, quality, color, visibility, structure, clarity of images. As an example, to illustrate the application, consider a scenario where a user has to perform scene analysis in an environment with low visibility. Low visibility may be due to weather conditions such as rain, fog, haze, snow, floods, or low light, or due to man-made conditions such as smoke, fire, or low-lit rooms. The ClearVision technique is founded on an image formation model that is physically and/or psycho-physically appropriate. Using the ClearVision technique on an image includes pre-processing neural network to identify an image anomaly such as rain, haze, or snow. In some implementations, the ClearVision enhancement technique may utilize logarithmic operators of human visual system to correct one or more anomalies that are identified. Additionally or alternatively, in some implementations, to correct one or more anomalies, a negative residual feature pyramid network based deep-learning system may be used to remove the effects of rain and snow in image and video data. Unlike conventional methods, the ClearVision technique may utilize contrast, intensity, edge, and center-surround information to enhance the data. Consider the use of thermal data for ClearVision. The ambiguous boundary and the noise-induced thermal data will be addressed in the network using a contrast, intensity, and edge guidance mechanism.

In another aspect of the disclosure, systems and methods for multi-modal data fusion are provided. Data fusion is the process of combining data from multiple sensors to achieve improved performance and inferences than what could be achieved by the use of a single sensor alone. Data fusion can be made between homogeneous or heterogeneous sensors. The multi-modal data enhancement and fusion techniques may be applied to improve multi-modal scene analysis systems. Applications include, but are not limited to, autonomous navigation vehicles, remote sensing, monitoring of manufacturing processes, robotics, automated target recognition, and medical applications.

In yet another aspect of the disclosure, systems and methods for multi-modal data classification are provided. Classification of data is the process of categorizing data into a given number of classes. With respect to imaging modalities, the goal of classification techniques are to correctly predict a label that characterizes the contents of the image. The classification technique may be applied to single data modalities or a combination of data modalities to provide better human vision and computer vision-based classifications. The multi-modal classification techniques may be applied to improve the multi-modal segmentation, object detection, and scene analysis systems. Some of the applications of this technique include, but are not limited to, machine vision, medical imaging, object detection, recognition, surveillance, navigation systems, first-responder technology, and content-based image retrieval.

In yet another aspect of the disclosure, systems and methods for multi-modal data segmentation are provided. The segmentation technique may be applied to single data modalities or a combination of data modalities to provide outputs that include, but are not limited to, foreground-background, object, semantic, instance, and panoptic segmentation. The multi-modal segmentation techniques may be applied to improve multi-modal object detection and scene analysis systems. It may further reduce the complexity of the intended systems by way of providing focus to areas-of-interest. Some of the applications of this technique include, but are not limited to, machine vision, medical imaging, object detection, recognition, surveillance, navigation systems, first-responder technology, and content-based image retrieval.

In yet another aspect of the disclosure, systems and methods for object detection/recognition. With regard to imaging modalities, object detection seeks to (1) find all objects in an image, (2) label them, and (3), compute their bounding box, enabling us to not only determine what is in the image but also where in the data an object resides. This may allow the system to label objects that are depicted (or otherwise represented in an image) in an image and identify relationships between the objects that are discernible from the image. The term "image", as used throughout the disclosure may refer to homogenous or heterogeneous multi-modal data of any length. Some of the applications of this technique include augmented reality, military systems, first-responder technology, and biomedical technology.

In yet another aspect of the disclosure, systems and methods for multi-modal, dynamic and static scene analysis are provided. A perceptual system or a scene analysis system is a computational system designed to make inferences about properties of a physical environment based on scenes. With respect to imaging modalities, scene analysis or also known as image understanding is defined as the combined process of describing the image content, the objects in it, location and relations between objects, and the events occurring in an image. Scene analysis is a natural ability of human beings, wherein they are able to categorize complex natural scenes instantly. Scene analysis performed on processed, enhanced, and artificial intelligence-based systems may lead to numerous applications with homogenous and heterogeneous multi-modal data.

According to yet another aspect of the present disclosure, systems and methods for mixed reality visualization are provided. Mixed reality visualization systems can operate in a physical world, an augmented world, and a virtual world.

Shown in FIG. 1 is a system 100, in which each of a plurality of users 102 is equipped with one or more respective sensors 104, a respective processor 106, and a transceiver 108. In some implementations, the sensor 104 of any of the users may include imaging devices (thermal, biomedical, visible, hyperspectral, multi spectral), eye-trackers, EEG and ECG sensors, audio, and manual annotation. For example, the sensors 104 of any of the user may include a camera module with one or more lenses and one or more corresponding image sensors. Additionally, the lens may be part of an array of lenses and an image sensor may be part of an image sensor array. In some implementations, the processor 106 and the respective transceiver 108 of each user 102 may be part of a smartphone, or another computing device, such as a VR headset or smart glasses, of that user. Additionally or alternatively, in some implementations, the sensors 104 of each user 102 may be sensors that are installed at the same location where the user is situated, rather than being worn by the user.

The respective processor 106 of each of the users may receive data from the user's respective sensors 104, and transmit the data (by using the user's respective transceiver 108) to a central processing system 110. The central processing system 110 may include any suitable type of distributed or integrated computing system. The central processing system 110 may include any suitable type of processing circuitry (e.g., one or more general-purpose processors and/or one or more application-specific integrated circuits, etc.), a memory (e.g., volatile or non-volatile memory, etc.), one or more communications interfaces, and/or any other hardware that is normally found in computing systems.

The central processing system 110 may be configured to perform multi-modal data acquisition. Specifically, the central processing system 110 may acquire data from one or more sensors (e.g., any of the sensors 104A-C), including but not limited to, multi-imaging sensors, 3D sensors, audio sensors, and human reaction capture sensors. The central processing system may also be configured to extract hyper-location data and web data for any of the users 102. Hyper-location data may be used for local map initialization and world map initialization among other operations. The acquired multi-modal data may contain different types of noise, including but not limited to, Gaussian noise, salt and pepper noise, speckle noise, and anisotropic noise. This noise can be filtered in the preprocessing stage by applying one or more filters depending on the noise present, such as, Gaussian filters to remove Gaussian noise, a median filter to remove salt and pepper noise, and/or other filters. The data stream may be further inspected for misalignment of frames, and corrections are made if necessary. The resulting processed data is fused to produce fused multi-modal data of any dimension. The fused multi-modal data can be more than a single fused element. For example, the fused data may be 3D-RGB data and 3-D eye-tracking data.

Consider an example of three-dimensional thermal fused data mapping and visualization. The central processing system 110 may use a combination of 3D sensors, visible cameras, and other imaging sensors. The central processing system 110 may also be capable of extracting hyper-location data and web data for the application. Hyper-location data may be used for local map initialization and world map initialization among other operations. The sensors may have different operating frequencies of frames and there may exist a lot of unusable frames, therefore a preprocessing step is used to extract viable frames from all sensors. Pre-processing is followed by a ClearVision enhancement step, followed by multi-modal data fusion that fuses the different sensor information. This may be followed by bundle adjustment which can be described as a process to optimize multi-senor intrinsic and extrinsic parameters, and 3D point triangulation to reconstruct a static scene. The output produces a 3D thermal fused map. This process may be iteratively generated and repeated to improve the map.

Consider an example in which the central processing system 110 receives data from a RADAR SLAM. This example uses radar sensors, odometry, Inertial Measurement Unit sensors as multi-modal data acquisition devices. Hyper-location data may be used for local map initialization and world map initialization, among other operations. The sensors may have different operating frequencies of frames, and there may exist a lot of unusable frames. Therefore, a preprocessing step is used to extract viable frames from all sensors. Pre-processing is followed by multi-modal data fusion that fuses the different sensor information.

Figure 2:
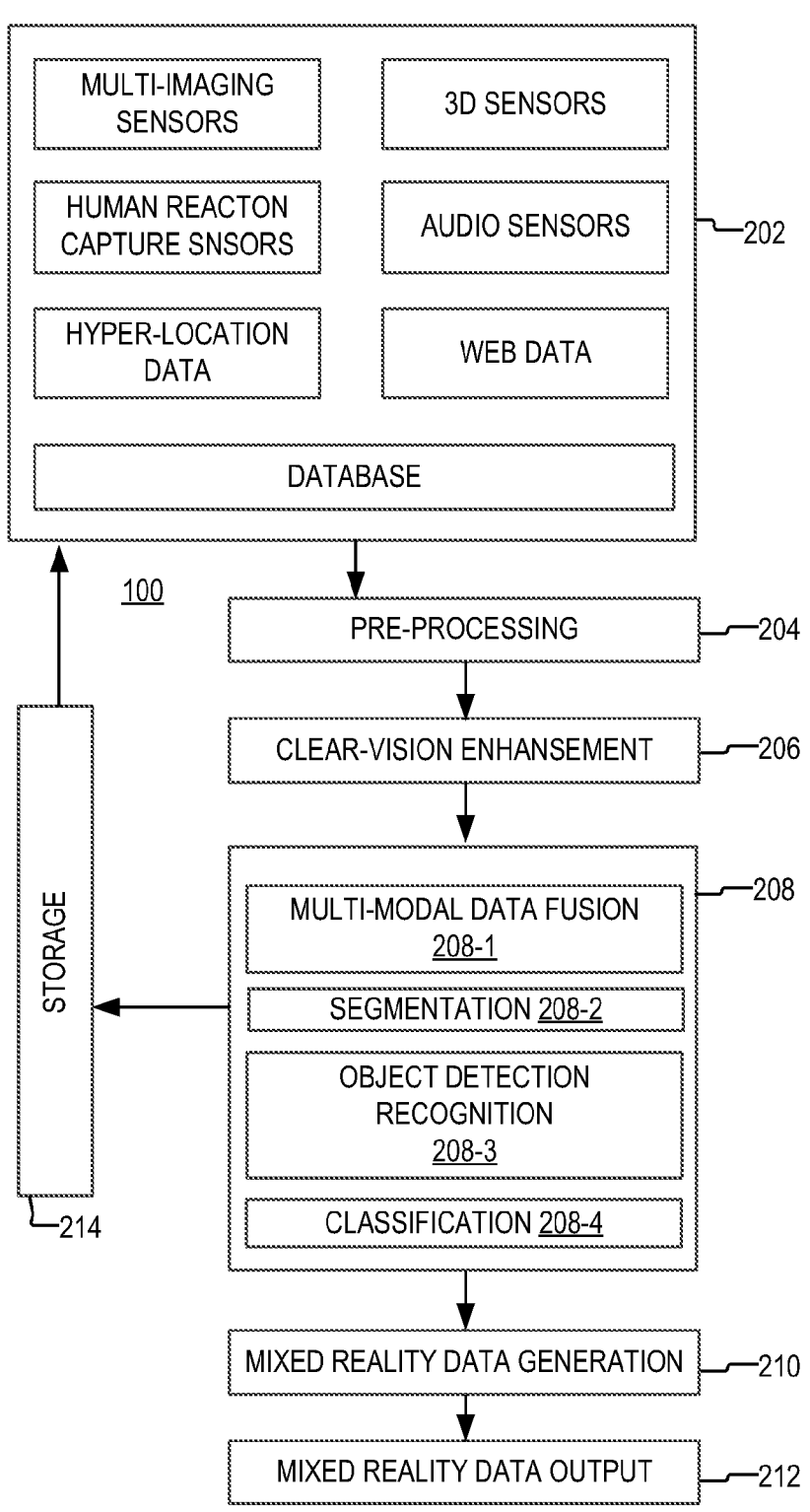
FIG. 2 is a diagram illustrating the operation of the system of FIG. 1, according to aspects of the disclosure.

FIG. 2 is a diagram illustrating the operation of the central processing system 110 in further detail, according to one aspect of the disclosure. The system 100 may acquire data from imaging sensors, 3D sensors, human reaction capture sensors, audio sensors, hyper-location data, the Internet, existing database, cloud storage and/or any other suitable source. The central processing system 110 may preprocess the acquired data to remove noise and align frames among other operations. The processed multi-modal data is fused. The output of the data fusion can be of any dimension. Further, the central processing system 110 may analyze the pre-processed data to describe the image content, the objects in it, location and relations between objects, and the events occurring in an image among other outputs. The result of this analysis may be stored in the memory of the central processing system 110 or cloud storage. The result of the analysis may also be presented on mixed reality devices (e.g., smartphones, VR headsets or smart glasses of users 102) to perform application-specific operations.

Stated succinctly, the system 100 may be configured to perform a process, which begins with data acquisition (202). The process beings with a data acquisition step (202), followed by a preprocessing step (204). The sensors may have different operating frequencies of frames and there may exist a lot of unusable frames, therefore the preprocessing step is used to extract viable frames from all sensors. Next, the pre-processed data is enhanced by using the ClearVision enhancement technique. Next, the data that is enhanced using the ClearVision technique is fused (208-1). Next, the fused data is segmented to produce one or more subsets of the fused data (209-2). Next, the resulting subsets are processed using appropriate pattern recognition techniques to identify objects that are depicted (or otherwise represented) in the fused data subsets (208-3). Next, the identified objects are classified using appropriate pattern classification algorithms (208-4). Mixed reality data is generated (210) by combining: (1) images of the objects, (2) labels of the objects, (3) visual enhancements (generated at step 206), which are used to highlight the objects. And finally, the mixed reality data is output (212). Outputting the mixed reality data may include rendering the mixed reality data on a display device of one of the smart glasses, smartphones, or headset displays of the users 102, rendering the mixed reality data on a display device of the central processing system 110, and/or transmitting the mixed reality data, over a communications network, to a client device that is configured to render the mixed reality data on a display of the client device.

Figure 3:
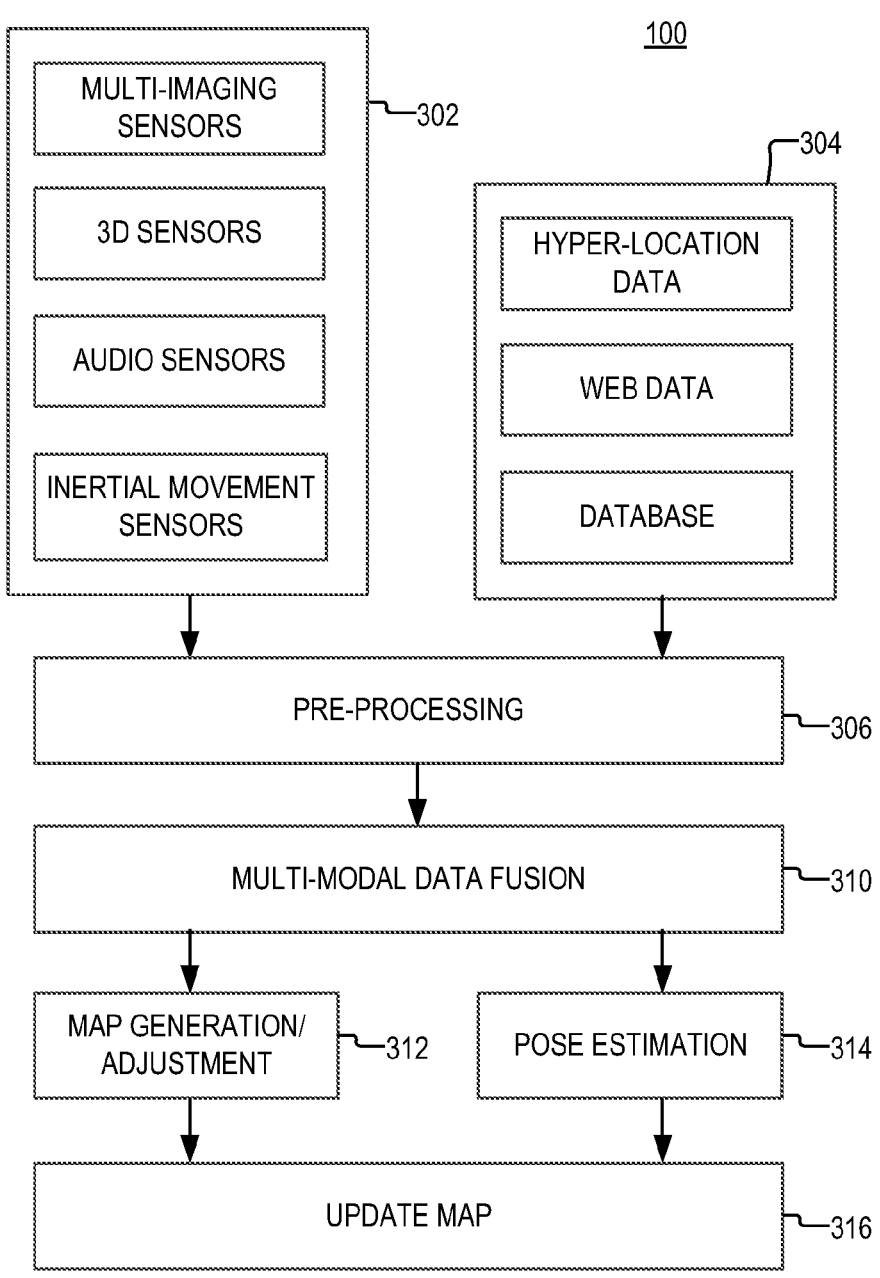
FIG. 3 is a flowchart of an example of a process, according to aspects of the disclosure.

FIG. 3 illustrates an example of a process for generating a dynamic map and tracking a user along the x, y, and z direction. According to the present example, the process is performed by the central processing system 110. At step 302, acquisition of data may be performed using one or more sensors, including but not limited to, multi-imaging sensors, 3D sensors, audio sensors, inertial movement sensors, and human reaction capture sensors. At step 304, hyper-location data and web-data for the application are extracted. The hyper-location data is used for local map initialization and world map initialization among other operations. At step 306, the data obtained at steps 302 and 304 are preprocessed. At step 310, the pre-processed data is fused. At step 312, a multi-modal or single modal 3D or 2D map is generated. At step 314, the pose estimation in all directions is calculated. At step 316, the information generated at steps 312 and 314 is used to iteratively update the map as new data is fed into the system. The results and data may be stored on a memory device or the cloud. The results can also be viewed on mixed reality devices to perform application-specific operations. As used herein, the term pose estimation refers to estimating the direction in which an object is facing. It could also refer to identifying the action being performed by the object, such as standing still, walking, running, crouching, spinning, swaying, etc. The object may be a person depicted in any of the data (or the fused data), an image of a car crash depicted in any of the data, and/or any other suitable type of data. In some implementations, the result of the pose estimation may include at least one of a first label that identifies an object (e.g., "firefighter F2", "firefighter F2", "door", "staircase", etc.), and/or a second label that identifies an action that is performed by the object or a state of the object (e.g., "running", "standing still", "crouching", "open", "closed", etc.).

Figure 8:
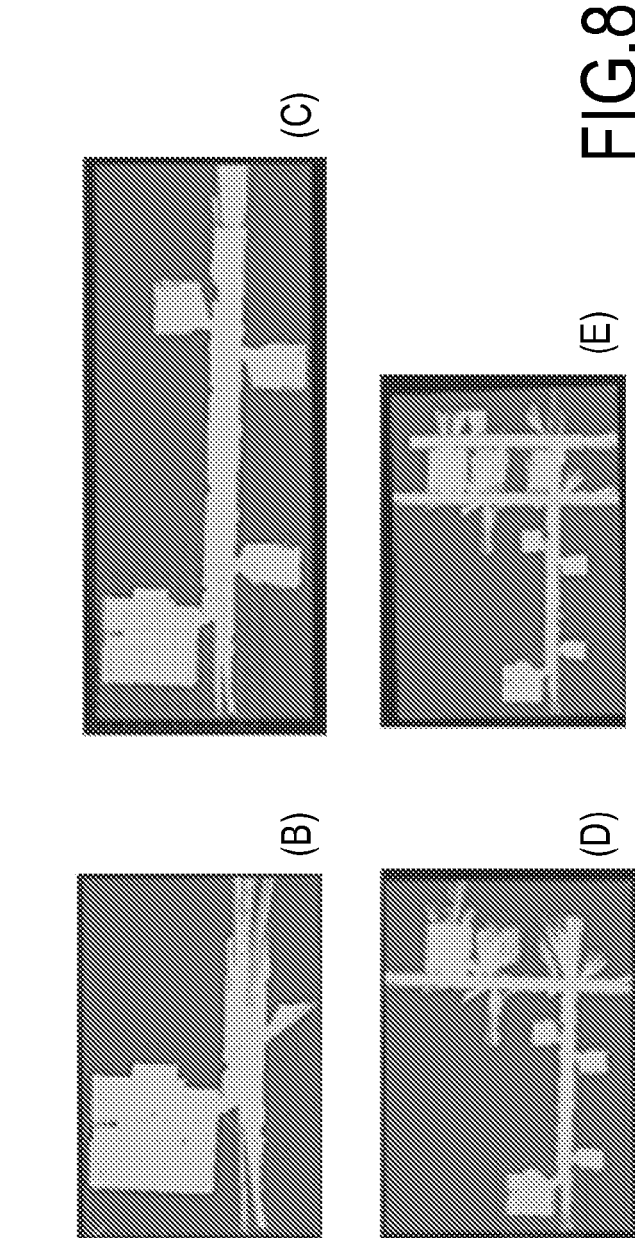
FIG. 8 is a diagram illustrating an example of a process for generating a map by using LIDAR data, according to aspects of the disclosure.

In some implementations, the map may be generated as discussed further below with respect to FIG. 8. In some implementations, the process discussed with respect to FIG. 3 may be used to generate a map of an area that is traveled by the user and update the map to identify the pose and/or current location of the user. The updated map may be displayed on the respective devices of any of the users 102.

Section 2: Enhancements and Detection in Traffic Incidents

In some implementations, the central processing system 110 may be arranged to perform highway incident detection. One disadvantage of existing highway incident detection technology is that they do not make use of available footage from highway traffic cameras. Additionally, these technologies rely significantly on expensive sensors, which drives up the overall cost of these systems and limits their scalability. On the other hand, monitoring and evaluating the massive amount of video data without the assistance of automated systems is impossible. Through the use of Artificial Intelligence (AI), models may be trained to enhance photos and enable robust detection and classification of traffic events, resulting in a more cost-effective deployment of incident response resources. This section addresses several issues, including the following: 1) the lack of a robust automatic incident detection system capable of emphasizing critical events while minimizing false alarms; 2) the inadequacies of current learning algorithms, which significantly degrade performance in adverse weather conditions; and 3) the absence of a dataset containing diverse footage of highway incidents to facilitate the development and validation of AI algorithms. As is discussed further below, the central processing system 110 may be used in conjunction with currently installed highway camera infrastructures for highway incident detection, including detecting wrong-way driving, traffic congestion, crashes, and bicyclists or pedestrians in tunnels, using artificial intelligence and image processing algorithms.

More particularly, the central processing system 110 may be arranged to: a) enhance images for improved visual perception b) distinguish between vehicle/object types, such as automobiles, buses, trucks, bicycles, and motorbikes; and pedestrians. c) determine the direction of traffic flow by utilizing motion flow vectors, picture segmentation, and machine learning algorithms, detect lane changes, and track cars as they enter and depart the frame to flag wrong-way drivers. d) employ video action categorization algorithms, accurately detect crashes on highways. f) detect bikes and pedestrians accurately in hazardous areas such as tunnels and roads f) create timely alerts in the event of an incident. g) perform reliably in a variety of lighting and environmental settings, and h) efficiently summarize several hours of recording, emphasizing the moments leading up to, during, and immediately after incidents.

In some respects, the central processing system 110 may help improve the quality of visual input data and enable the detection of objects in adverse weather and environmental conditions. To enable the detection of objects in adverse weather and environment conditions, the central processing system 110 may operate efficiently across multiple input modalities, including visible spectrum, thermal, and near-infrared; a crash detection module based on video action classification, a road mapping module, and an object detection and tracking module.

In some implementations, the central processing system 110 may use multi-modal image enhancement algorithms and picture-to-image translation techniques to provide high detection accuracy across many modalities. Simultaneously, the central processing system 110 may use a unique event dataset to help train complex artificial intelligence issue detection methods. Furthermore, the central processing system 110 may rely on an optimized octonion-based convolutional neural network-based object detection or tracking module. In some respects, using a single network for object recognition and tracking is advantageous because it may reduce processing time and overcome existing design limitations. Furthermore, the central processing system 110 may rely on a motion vector-based autonomous road-mapping method for detecting wrong-way drivers, which does not rely on a fixed camera or background. The method may use real-time video from highway traffic cameras.

According to the present disclosure, it has been determined that the Octonion Convolutional Neural Network (OCNN) outperforms typical convolutional networks for tasks including identifying vehicles, buses, lorries, bicycles, motorbikes, and people. In some implementations, the OCNN may be configured to preserve correlation between convolutional kernels. Preserving correlation between convolution kernels improves the network's dynamic ability to adapt to new scenarios not covered by the training set; faster convergence reduces training time; and reducing the number of learnable parameters in the network reduces computational cost. This makes the OCNN advantageous for use in fields, such as biomedicine, and automated driving, which are now hampered by the inefficient processing demands of neural networks.

Convolutional neural networks (CNN) do not consider the link between color channels and their noise, reducing color structural information and providing a suboptimal representation of color images. Quaternion multivalued neural networks (QCNN) were recently introduced by Dr. Agaian et al. With little training data, the quaternion multi-valued neural network outperforms conventional learning frameworks. Experiments showed that employing quaternion numbers for neural architectures improved performance while reducing the amount of learnable parameters. To analyze multi-modal images efficiently, the octonion algebra, an extension of both quaternion and complex algebras, is used as described in A. M Grigoryan, S. S. *Agaian, and Society of Photo-optical Instrumentation Engineers, Quaternion and Octonion color image processing with MATLAB*. In order to examine 8 frames together, the octonion number has one real part and seven imaginary parts, making it possible to 1) transform a grayscale or thermal image to a "Octonion Image" and 2) convert eight frames into the octonion number. To extract more meaningful features and learnable parameters, the network must have these attributes.

Moreover, the ClearVision technique may help mitigate the effects of bad weather while keeping color and structure. The new method will use the visual system's logarithmic operators. Contextual information will be used to enhance photos. Besides multi-modal image fusion, a novel rain and snow removal strategy employing a negative residual feature pyramid network is utilized.

In some implementations, the central processing system 110 may use an OCNN-based Detail Enhance Network (ODENet) model in which the OCNN that is used by the ClearVision technique cascades on a residual network. As a result, local and global features from earlier layers may be merged into later layers, retaining information from low-resolution photos. This design allows the depth of the OCNN to be reduced the network's depth without affecting performance. In some respects, OCNN-based Detail Enhance Network (ODENet) model may help improve super-resolution task performance. By combining additional OCNN blocks such as octonion convolution, batch normalization, and weight initialization, the ODENet model builds on the advantages of deep cascaded residual networks. This preserves information contained in the low-resolution image by incorporating local and global features from earlier layers into later layers in the network. As noted above, the ODENet model enables the depth of the OCNN network that is used by the ODENet model to be reduced without affecting performance. This in turn reduces the number of training parameters used by the OCNN and ensures real-time super-resolution.

Figure 4A:
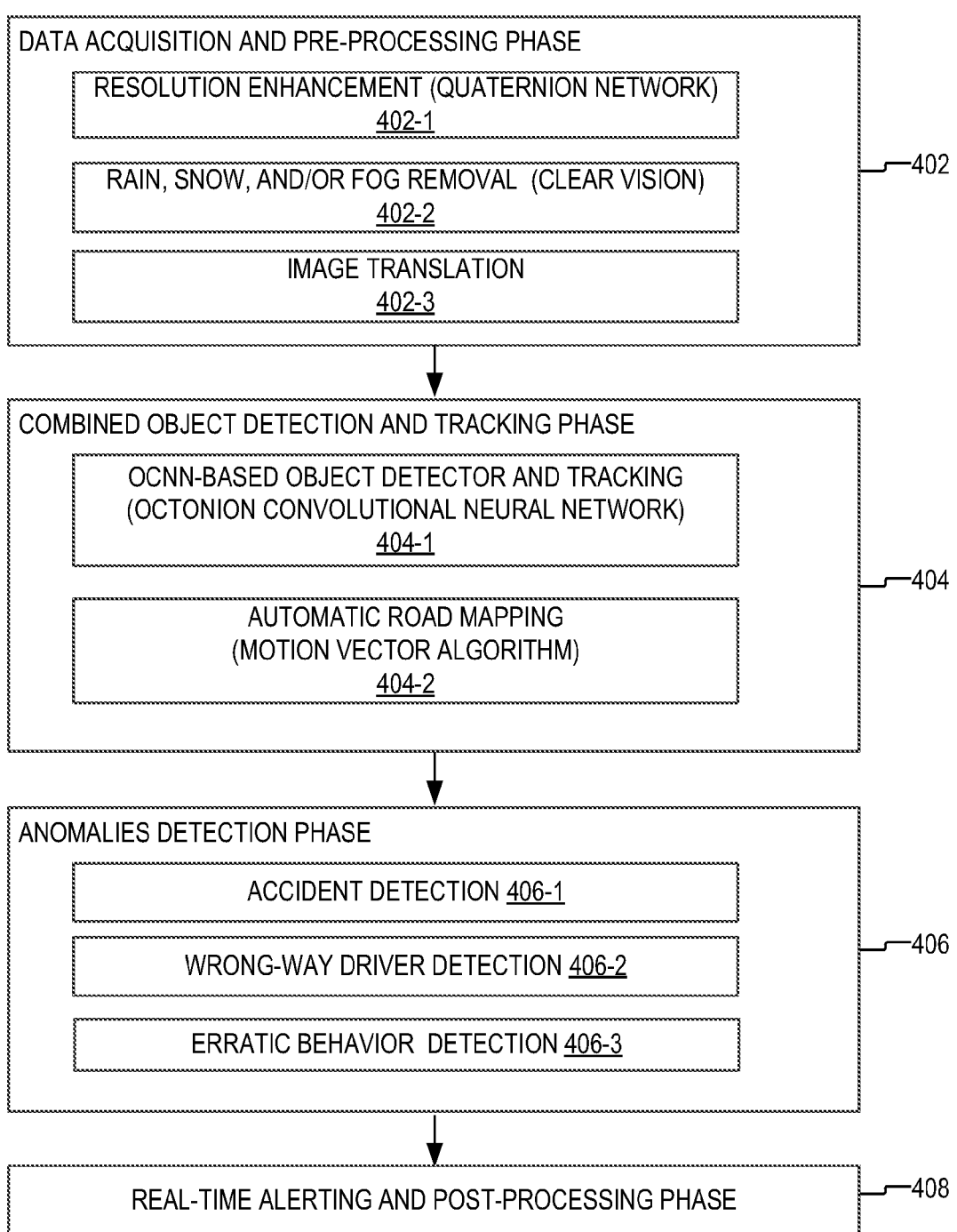
FIG. 4A is a flowchart of an example of a process, according to aspects of the disclosure.

FIG. 4A is a flowchart illustrating aspects of the operation of the central processing system 110, according to one implementation. In the example of FIG. 4, the central processing system 110 implements the ODENet model, which is discussed above, and which features a cascaded arrangement of an OCNN and other layers. As illustrated, the ODENet model may include a data acquisition and pre-processing phase, a combined object detection and tracking phase, an anomalies detection phase 406, and a real-time alerting and post-processing phase 408.

Phase 402 may include a resolution enhancement step 402-1, a rain-snow and/or fog removal step 402-2, and an image translation step 402-3. Phase 402, is executed on one or more input images that are received by the ODENet model. The input images may be images of a section of road. The images may be part of different video streams. The images may be generated by different sources (e.g., cameras that have different vantage points, visible-range and thermal range cameras, etc.) At step 402-1, the ODENet model may use a quaternion neural network to enhance the resolution of the one or more input images. At step 402-2, the ODENet model may remove, rain, snow, and/or fog by using the ClearVision technique that is discussed above. At step 402-3, the ODENet model translates any thermal images (which are part of the one or more input images) to visible range images.

Phase 404 may include an OCNN-based object detection and tracking step 404-1 and an automatic road-mapping step 404-1. At step 404-1, the ODENet model uses the OCNN discussed above to classify objects that are depicted (or otherwise represented) in the one or more input images. At step 404-2, the ODENet model generates a respective motion vector for one or more of the objects that are detected at step 404-2. The respective motion vector for any of the objects may be used to determine whether the object is going in the wrong direction. The generation of motion vectors, in other words, enables the central processing system 110 to detect wrong-way drivers.

Figure 4B:
FIG. 4B shows an example of an overlaid image, according to aspects of the disclosure.
Figure 4C:
FIG. 4C shows an example of an overlaid image, according to aspects of the disclosure.
Figure 4D:
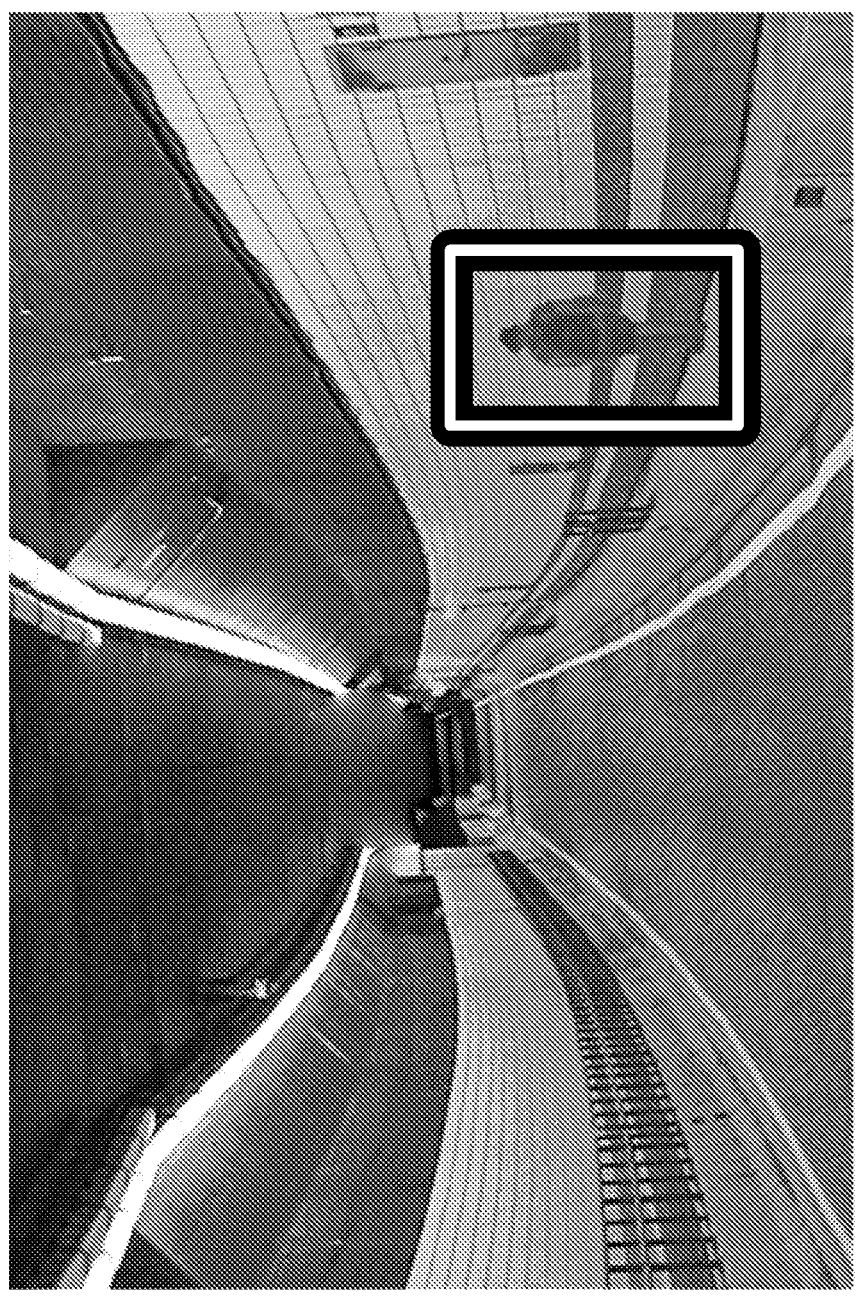
FIG. 4D shows an example of an overlaid image, according to aspects of the disclosure.

Phase 406 may include an accident detection step 406-1, a wrong-way driver detection step 406-2, and an erratic behavior detection step 406-3. At step 406-1, the ODENet model uses the input images as well as the output of phases 402 and 404 to detect crashes and detect fire. Furthermore, the ODENet model may compile before and after frames that show the state of the road before and after a crash has occurred. As illustrated, in this image the site of the crash is highlighted using a rectangle. FIG. 4B depicts an overlaid image that is produced by the ODENet model, which flags a crash. As illustrated, in this image the site of the crash is highlighted using a rectangle. At step 406-2, the ODENet model detects and flags wrong-way drivers. The wrong-way drivers may be detected, at least in part, based on the motion vector data generated at phase 404. FIG. 4C depicts an overlaid image that is generated by the ODENet model, in which the ODENet model flags wrong-way driver. The wrong-way driver is highlighted with a rectangle, as shown. At step 406-3, the ODENet model detects and flags erratic behavior. The detected erratic behavior may include drifting and skidding (determined, at least in part, based on motion vectors), the presence of bicyclists or pedestrians in a tunnel (determined, at least in part, based on the object classification performed at step 406-1), excessive speeding, etc. FIG. 4D shows an example of an overlaid image that is generated by the ODENet model in which a pedestrian in a tunnel is highlighted.

At phase 408, the ODENet model may output an alert if an anomaly is detected at phase 406. Outputting the alert may include rendering the alert on a display, speaker, or another output device of the central processing system 110. Additionally or alternatively, outputting the alert may include transmitting the alert, over a communications network, to a remote device. The remote device may be a device that is used by law enforcement or any other suitable device. In some implementations, the alert may be output in response to the ODENet model detecting a crash or fire on the road. As another example, the alert may be output in response to the ODENet model detecting a fire on the road. As yet another example, the alert may be output in response to detecting a wrong-way driver or erratic behavior on the road.

In some implementations, at phase 408, the ODENet model may perform traffic congestion analysis, automatic recordation of scenes where incidents occur, or log data to files. Furthermore, at phase 408, the ODENet model may perform video summarization. More particularly, the ODENet model may automatically condense an extended video sequence (of a road section where an accident occurred) into a few minutes or seconds to show where the accident has occurred. The condensed video may be used for law enforcement purposes.

Section 3: Situational Awareness of First Responders

In some implementations, the central processing system 110 may be arranged to assist first responders in the performance of their duties. First responders play a critical role in emergencies, such as anthropogenic fires, accidents, terrorism, and natural disasters. These dynamic situations require monitoring of multiple parameters that may hinder rescue efforts. Furthermore, damaged buildings and roadways, debris, smoke, fire, and conditions such as rain, smoke, haze, and snow complicate the observer's ability to monitor situations for detecting victims and hazards. It is critical that rescuers can assess hazardous conditions before risking their lives and be armed with intelligent technologies that enable them to respond to dynamic situations.

In some implementations, the central processing system 110 can be used to see through smoke, detect dangerous conditions, such as fire hose burn-through, imminent structural damage, and most importantly, locate and track firefighters in dynamic situations without the use of GPS. On the scene of an emergency, firefighter accountability is critical. Commanders need to know the location of every firefighter, including what floor they are on. However, most tracking systems are two-dimensional in nature and do not provide floor information.

Figure 5:
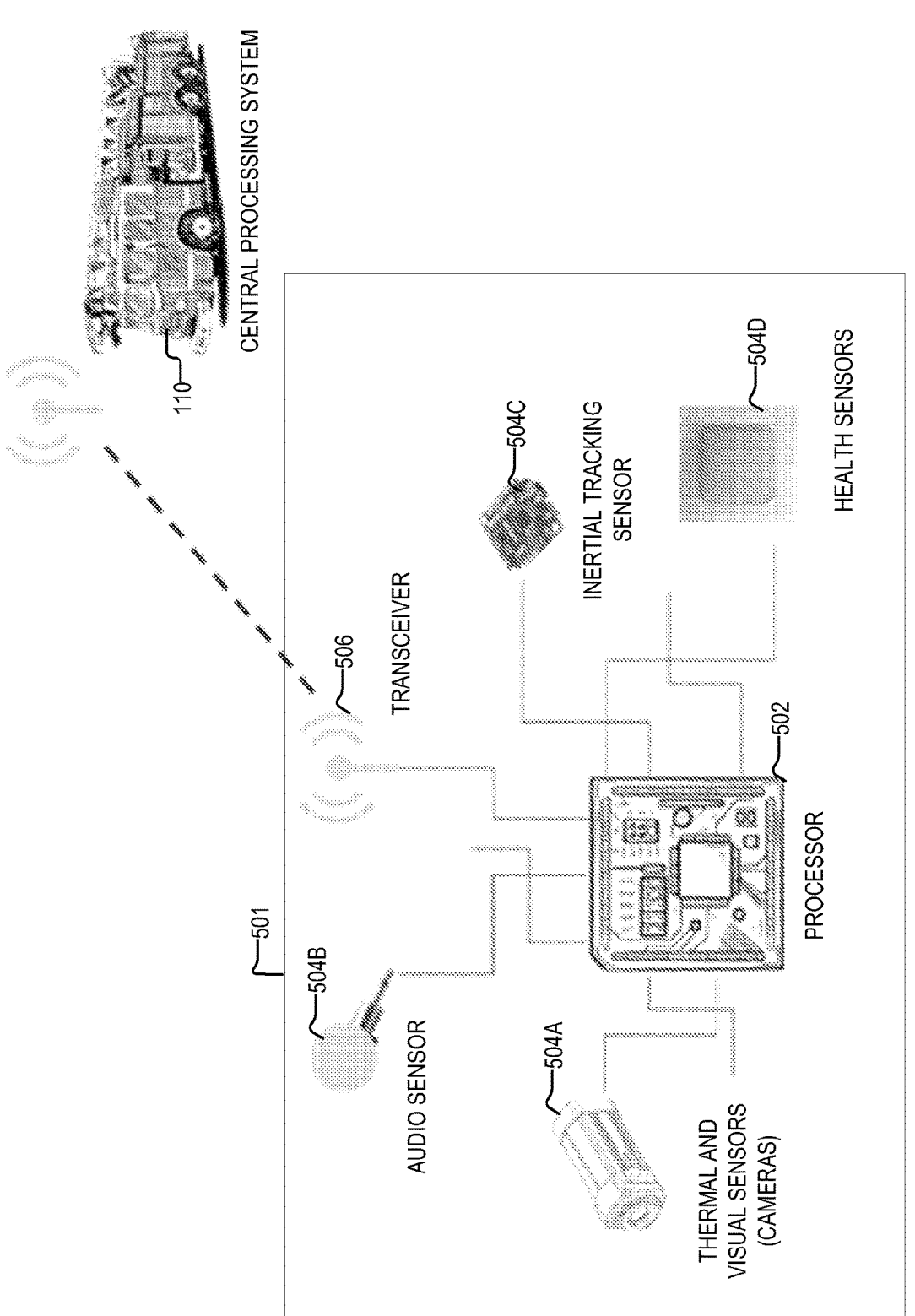
FIG. 5 is a diagram of an example of a system, according to aspects of the disclosure.

FIG. 5 shows an example of a system 500 that includes a device 501 and the central processing system 110. The device 501 may include smart glasses or a head display that is worn by a firefighter. The device 501 may include a processor 502 that is configured to collect data from sensors 504A-D, and forward the data to the central processing system 110 by using a transceiver 506. The sensor 504A may include one or more thermal or visible range cameras. The sensor 504B may include one or more microphones or other audio sensor. The sensor 504C may include an inertial tracking sensor. The sensor 504D may include one or more health sensors. The processor 502 may receive data from the sensors 404A-D and forward the data to the central processing system 110 for further processing. Although in the example of FIG. 5 the sensors 504A-D are integrated into the device 501, alternative implementations are possible in which one or more of the sensors 504A-D are provided separately from the device 501 and connected to the device 501 via a wired or wireless connection. Although in the example of FIG. 5 the sensors 504A-D are worn on the person of a firefighter (or other rescue personnel), alternative implementations are possible in which any of the sensors 504A-D is not worn on the person of the firefighter. For example, in some implementations, any of the sensors 504A-D may be installed at a location where the firefighters are working (e.g., in a street fixture). In such implementations, the sensor may transmit data directly to the central processing system 110 (independently of the device 501).

Figure 6A:
FIG. 6A is a diagram of an example of an image, according to aspects of the disclosure.
Figure 6B:
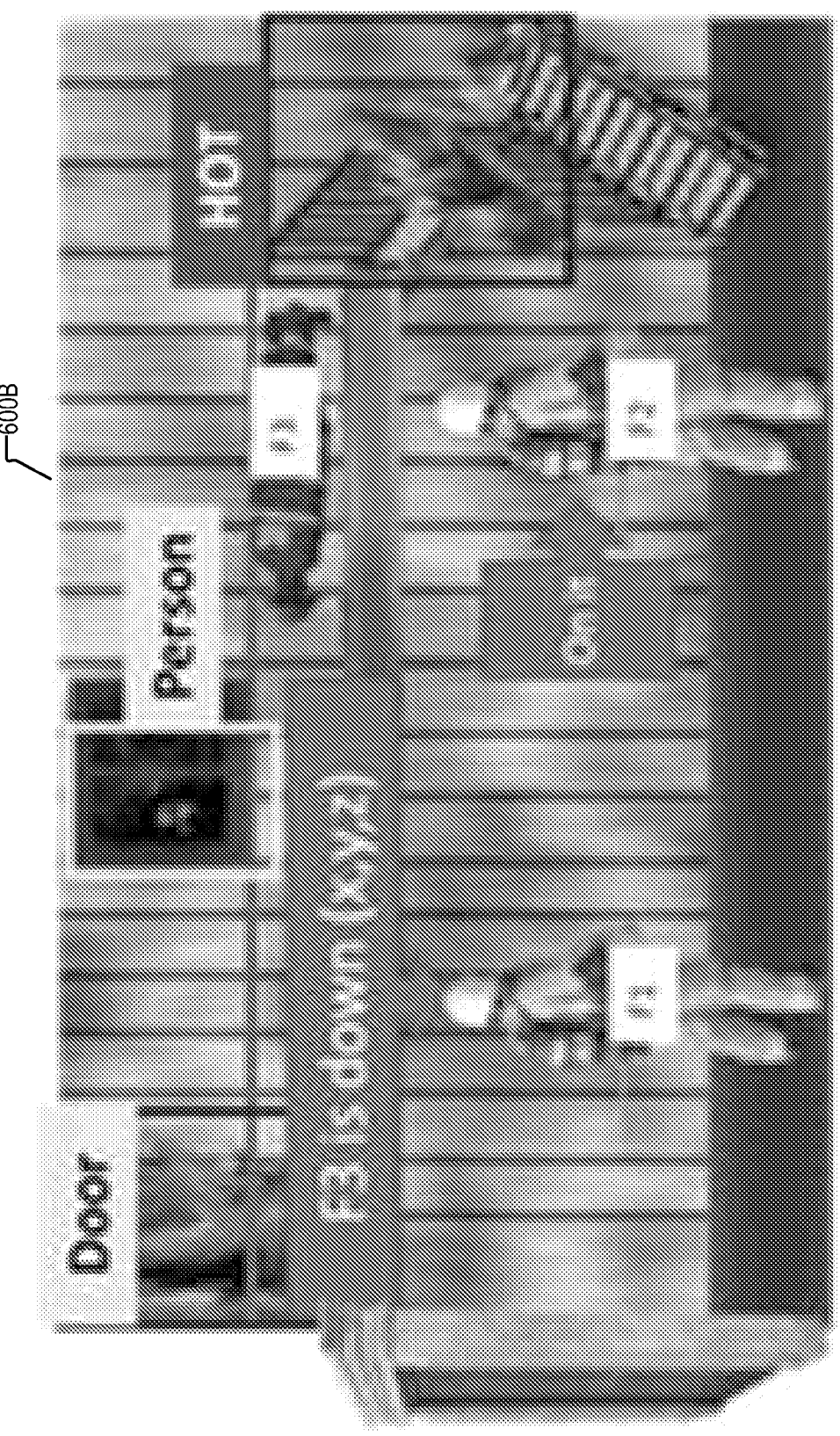
FIG. 6B is a diagram of an example of an image, according to aspects of the disclosure.
Figure 6C:
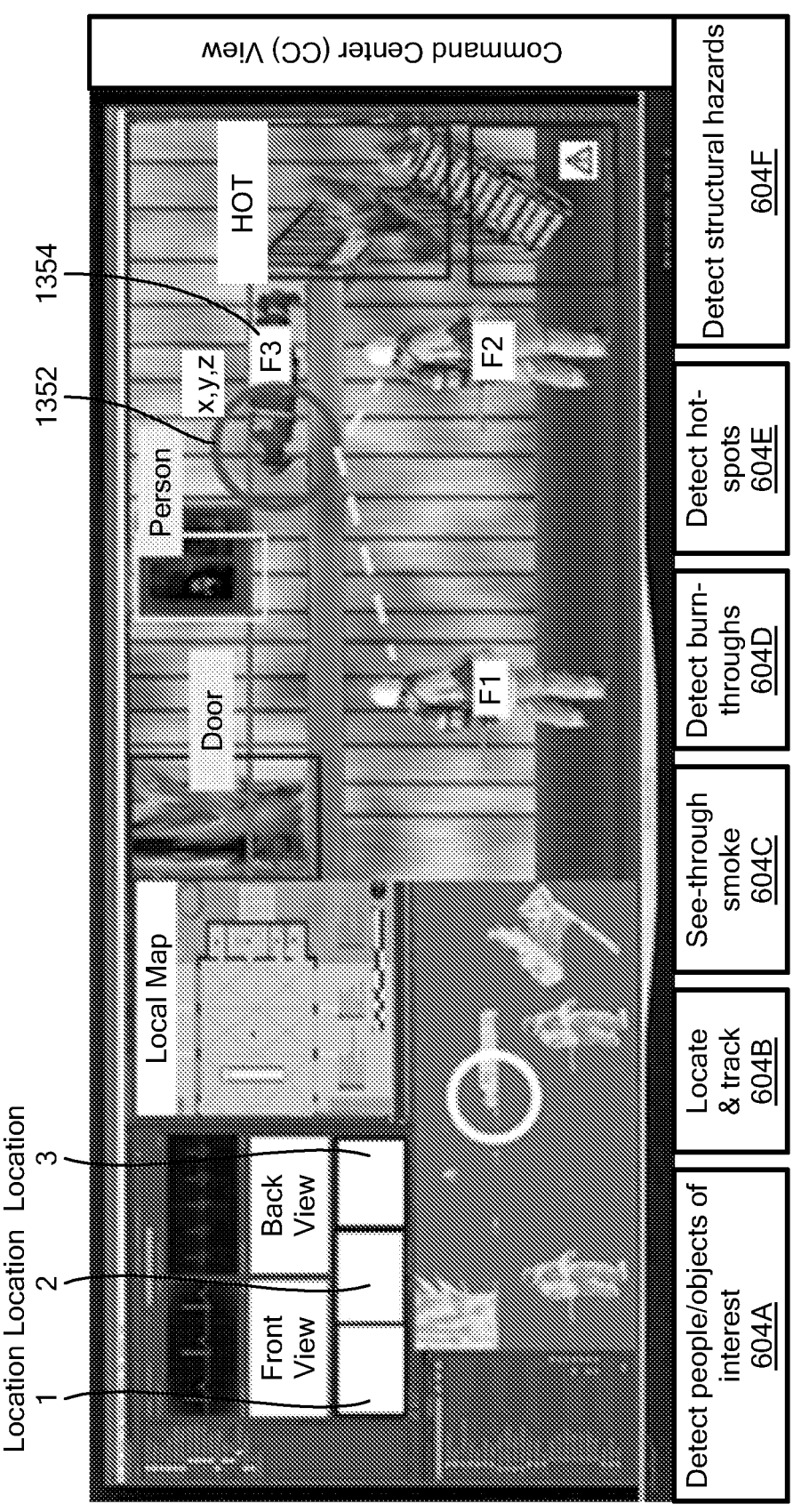
FIG. 6C is a diagram of an example of a user interface, according to aspects of the disclosure.

FIG. 6A-C illustrates an example of processing that is performed by the system 600. FIG. 6A shows an image 600A that is generated by a camera at the site of a fire. The image may be part of a video stream that is transmitted by the camera to the central processing system. FIG. 6A illustrates that when firefighters enter a building on fire, they are engulfed in fire and smoke. If one of the firefighters falls, other firefighters may not be aware of their location without visual confirmation. Furthermore, firefighters may not be able to recognize if nearby objects are hot.

FIG. 6B, illustrates an image 600B that is generated by central processing system 110 based on the image 600A. As illustrated, when generating the image 600A, the central processing system 110 may: (i) process the image 600A to remove smoke, (ii) perform pattern recognition on the image to identify objects that are depicted in the image, (iii) classify the objects, and (iv) superimpose on the image labels that identify the objects' classes. Furthermore, the central processing system 110 may add to the image 600B labels that identify whether certain objects are hot (e.g., based on having detected fire at the location of the objects). The central processing system 110 may also add to the image 600B labels that identify the location of individual firefighters. In addition, the central processing system 110 may detect when a firefighter has fallen and alert the others to help him. In some implementations, FIG. 600B is an example of an image that would be presented on the headset display of individual firefighters.

FIG. 6C is an example of a user interface 600C of the central processing system 110. The user interface 600C may be displayed on a display of the central processing system 110 at the same time the image 600B is displayed on the headset displays of individual firefighters. As illustrated, in addition to the image 600B (shown in FIG. 6B), the interface 600C may include a map of the site of the fire and a thermal image of the site of the fire. Furthermore, the interface may include buttons 604A-F. Activating the button 604A may cause the central processing system 110 to classify objects that are depicted in the image 600A and display labels corresponding to the objects (both on the headset displays of the firefighters and the display of the central processing system 110). Activating the button 604B may cause the central processing system 110 to locate one or more of the firefighters and label the firefighters in the version of the image 600A that is displayed on the headset displays of the firefighters and the display of the central processing system 110. Activating the button 604C may cause the central processing system 110 to remove smoke from the version of the image 600A that is displayed on the headset displays of the firefighters and/or the display of the central processing system 110). Activating the button 604D may cause the central processing system 110 to detect and mark burnthroughs in the version of the image 600A that is displayed on the headset displays of the firefighters and the display of the central processing system 110). Activating the button 604E may cause the central processing system 110 to detect and mark hotspots both in the version of image 600A that is displayed on the headset displays of the firefighters and/or the display of the central processing system 110). Activating the button 604F may cause the central processing system 110 to detect and mark structural hazards both in the version of image 600A that is displayed on the headset displays of the firefighters and/or the display of the central processing system 110).

Figure 6D:
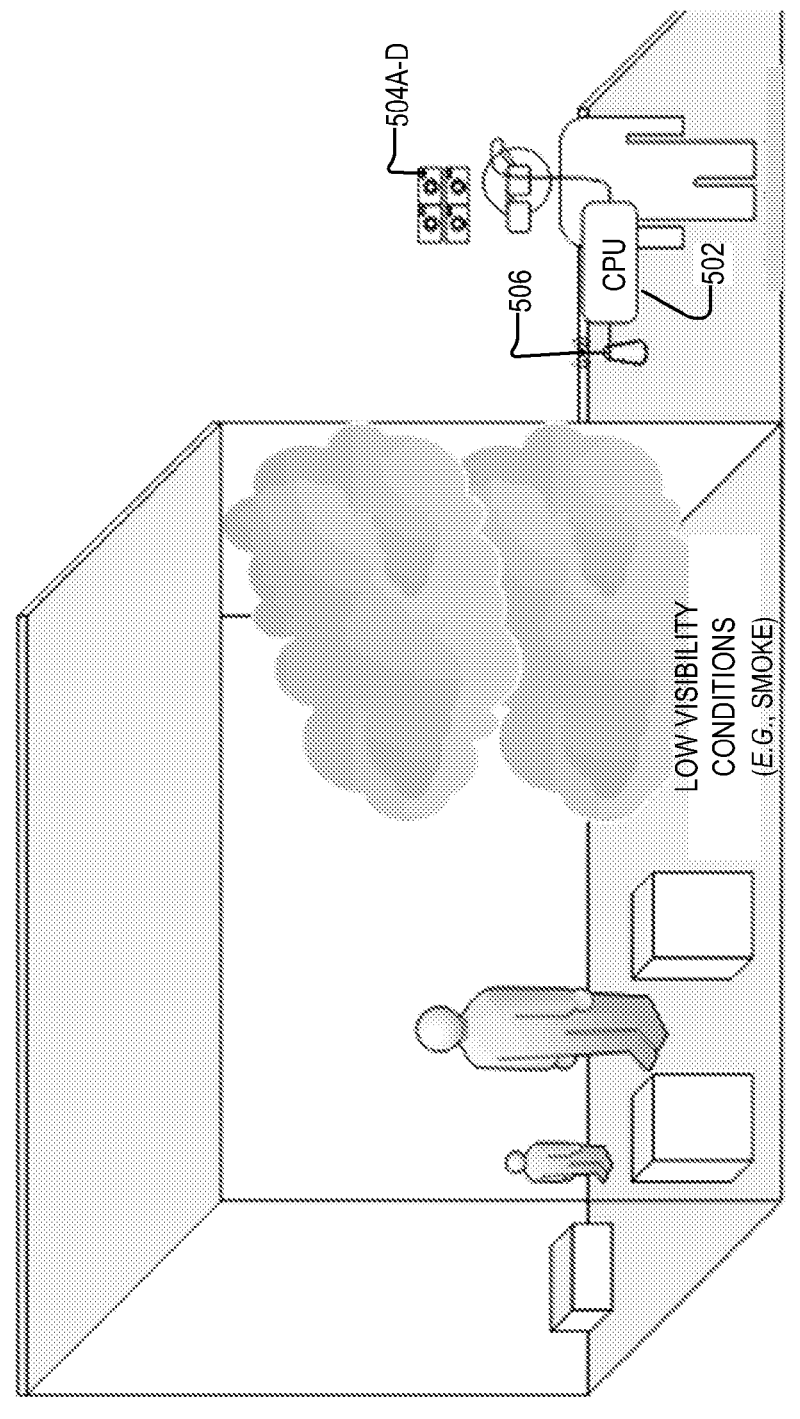
FIG. 6D is a diagram illustrating the operation of the system of FIG. 5, according to aspects of the disclosure.

FIG. 6D shows an example of a use case of the system 500 (shown in FIG. 5). In the example of FIG. 6D, the sensors 504A-D are embedded in smart glasses that are worn by a firefighter who is entering a room on fire. Present inside the room may be smoke, persons, and various obstacles (represented as cubes in FIG. 6D). The system 500 may use the ClearVision techniques to remove the smoke from images that are captured by the smart glasses and which show the field of view of the firefighter. The enhanced images (i.e., images without smoke) may be displayed on one or both displays of the firefighter's smart glasses. Furthermore, the system 500 may classify and label each of the objects. The labels for the objects may be displayed on the smart glasses or on a display of the central processing system 110. For instance, if an object is classified as being a table the label "table" may be displayed by the object. Furthermore, the system 500 may identify the positions of the people in the room and output (on the smart glasses) markers that denote the positions of firefighters, and which can be used to guide the firefighters to the people. Although in the example of FIG. 6D smoke is removed from images captured by the smart glasses, it will be understood that the system 508 may enhance images in a number of ways before the images are displayed on the smart glasses. For example, the system may increase the contrast or brightness of the images to compensate for low-lighting conditions or remove smoke or haze from the images.

Figure 7:
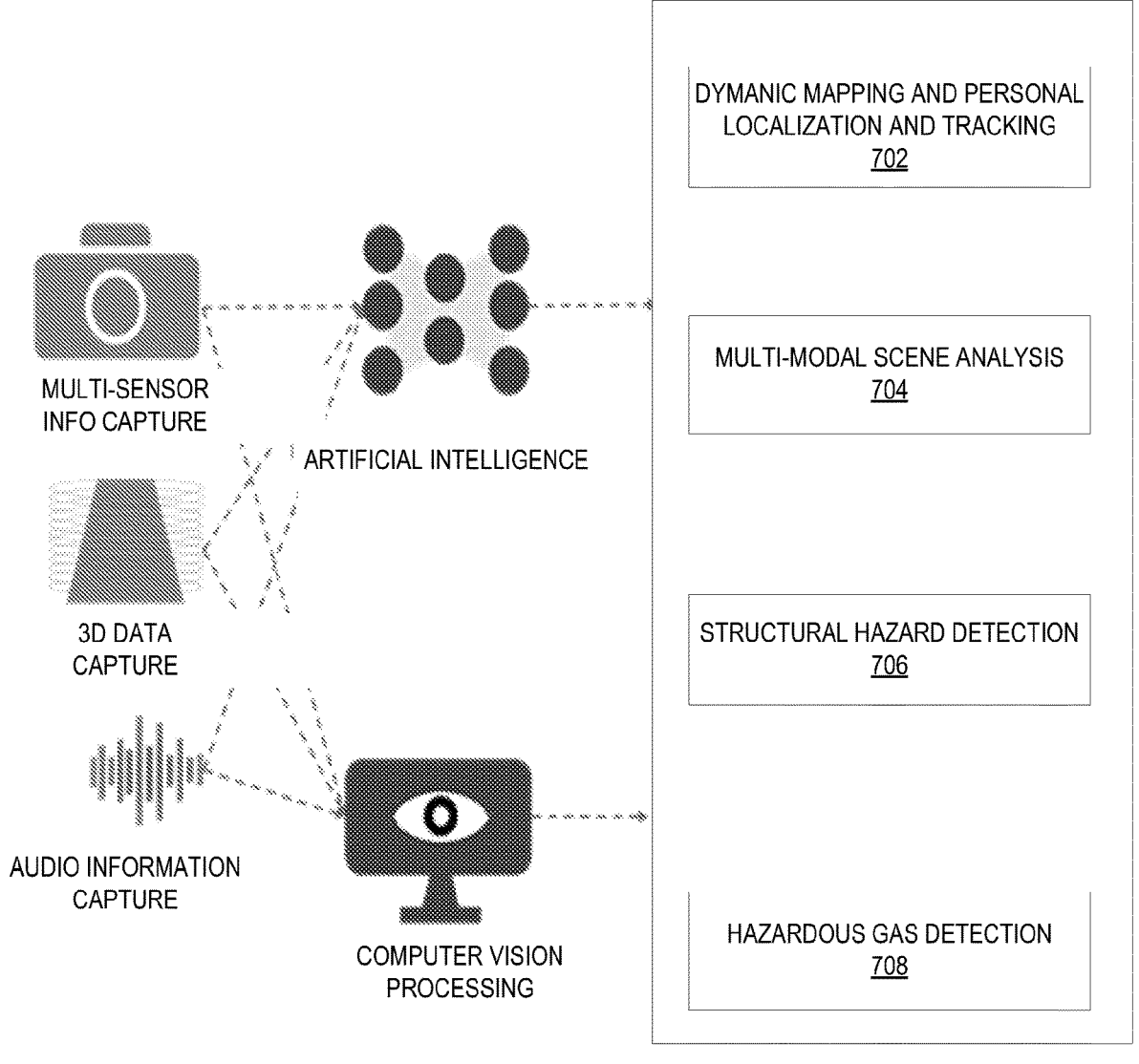
FIG. 7 is a diagram illustrating the operation of the system of FIG. 5, according to aspects of the disclosure.

FIG. 7 is a schematic diagram illustrating the approach applied by the central processing system 110 towards seamlessly utilizing and visualizing sensor information in a three-dimensional situational map to guide responders' actions and enhance their efficiency reduces the risk factor for responders. As illustrated, when deployed in an emergency response context, the central processing system 110 may utilize a dynamic mapping and personal tracking module 702, a multi-modal scene analysis module 704, a structural hazard detection module 706, and a hazardous gas detection module.

Dynamic mapping, personal localization, and tracking: The module 702 provides multi-object detection and tracking mechanism even in the absence of GPS. This module may be able to detect firefighters and civilians trapped in the fire. Upon detection, it may deliver time precise tracking & positioning information of the individuals to the command center to aid in decision making. The module 702 may allow the central processing system 110 to traverse through an unknown environment. The module 702 may use Lidar technology to track the person from a starting point to an unknown location and back to the starting point to create a loop. The use of Lidar technology allows the module 702 to work in poorly illuminated areas. An example of how Lidar technology is utilized by the module 702 is provided in FIG. 8. In panel (a) of FIG. 8, the researcher is holding the lidar sensor and moving around a hallway. The data from the leader is wirelessly transmitted to the system 508. Using SLAM technology, a real-time 2-D map may be generated by the system 508 based on the Lidar data. The 2-D map may be visualized as illustrated in panels (b)-(e) of FIG. 8. A map that is displayed in this manner may be output on the display of central processing system 110 and/or the headset displays of the firefighters. The map may include markings of the locations of the firefighters.

Multi-modal scene analysis: The module 704 may be configured to perform multi-modal scene analysis. Scene analysis or scene understanding typically involves inferring the context of a scene. The module 704 may use a custom enhancement algorithm (ClearVision) to counter the effects of environmental conditions while preserving critical information.

Structural hazard detection: This module 706 may provide structural situation awareness to firefighters (and other personnel). The module 706 may detect objects such as roofs, floors, doorframes, and warn firefighters about the imminent collapse of floors, shelter, and other similar structures. It may keep track of a possible collapse zone and send real-time signals to the command station when unusual situations are encountered. Another important aim is to help firefighters detect hotspots (specific objects or regions around them that are potentially too hot) in real-time. It may detect and track the hose and send real-time signals to the command station when such potential burn-through situations are encountered. As can be readily appreciated, the module 706 may: (i) use image recognition to identify structures the susceptible to fire damage, (ii) detect the presence of fire at the location of those structures, and (iii) output an alert that the identified structures may collapse if exposed to fire for too long.

Hazardous gas detection: The module 708 may utilize Middle Wavelength Infrared (MWIR) imagers (and/or any other type of infrared imager) to detect the presence of hazardous gas (or any other type of gas) in high-stress environments. The module 708 may enable the central processing system 110 to alert firefighters to dangers stemming from the presence of hazardous gasses. This module may enable the central processing system 110 to mark hazardous gas leaks in the version of the image 600A that is output on the display of the central processing system 110 and/or the headset displays of the firefighters.

Section 4: Analysis of Cognitive State of First Responders

The central processing system 110 may be configured to analyze the cognitive state (or other aspects of the cognition) of first responders. The central processing system 110 may employ different sensors such as eye-trackers, audio, and manual annotation as a single entity to curate data. The system and method mimic the perception of a human expert and present credible and meaningful information for a wide range of applications in Artificial Intelligence.

In some implementations, the central processing system 110 may use gaze detection to determine the cognitive state of first responders (and other personnel). To track the gaze of a first responder (or another person) the central processing system 110 may receive data from an eye tracker (e.g., a camera that is filming the eye movements of the person and/or another camera that shows the field of view of the person). Eye gaze tracking is the process of measuring any eye activity, also known as the point of gaze. More specifically, it analyses human processing of visual information, measuring attention, interest, and arousal. By way of example, a person's gaze can include fixation, saccades, smooth pursuit movements, vergence movements, and vestibulo-ocular movements. In this regard, an indication of the gaze of a person at a particular instant, that is determined by the central processing system 110, may include one or more of: (i) a point in the field of view of the user on which the user is fixating, (ii) a point in the field of view of the user that is paid greater (or lesser) attention than other points, (iii) a point in the field of view of the user that has invoked the user's interest, (iv) a point in the field of view the user that has caused the user's nervous system to become aroused, (v) an area in the field of view of the user that is associated with smooth pursuit movements, etc. As used throughout the disclosure, the term "gaze tracking data set for a user" may refer to a data set that identifies one or more of: (i) a point in the field of view of the user on which the user is fixating, (ii) a point in the field of view of the user that is paid greater (or lesser) attention than other points, (iii) a point in the field of view of the user that has invoked the user's interest, (iv) a point in the field of view the user that has caused the user's nervous system to become aroused, (v) an area in the field of view of the user that is associated with smooth pursuit movements, etc. Additionally or alternatively, the term gaze tracking data set may also refer to data that is received (e.g., at the system 110) from an eye tracker, which the user is wearing.

The human brain achieves spatial reasoning of a scene with the help of vision and sound. To achieve the kind of visual perception, a neural network may be trained to utilize some basic human senses such as eye-tracking and audio. Eye-tracking and speech data can be used to train a network to provide attention to regions that the user is more interested in. While collecting real-world data is becoming easier and cheaper, analyzing and visualizing this data remain difficult and time-consuming. As such, there is a significant need for developing an efficient data visualization and analysis tools for large-scale datasets.

Data collection is a major bottleneck in machine learning and an active research topic in multiple communities. There are largely two reasons data collection has recently become a critical issue. First, as machine learning is becoming more widely used, we are seeing new applications that do not necessarily have enough labeled data. Second, unlike traditional machine learning, deep learning techniques automatically generate features, which saves feature engineering costs, but in return may require larger amounts of labeled data. Interestingly, recent research in data collection comes not only from the machine learning, natural language, and computer vision communities, but also from the data management community due to the importance of handling large amounts of data. In this survey, we perform a comprehensive study of data collection from a data management point of view. Data collection largely consists of data acquisition, data labeling, and improvement of existing data or models.

Most computer vision algorithms require large amounts of highly accurate annotated data, which are used as ground truth to the problems that they are trying to solve. Researchers usually use existing datasets if they are available, else they create the datasets themselves. However, creating highly accurate annotated datasets is extremely time-consuming.

Researchers are striving to create AI models that match or even surpass human capabilities. To meet this expectation, it is crucial to have "valid data" to develop such models that can accurately mimic the behavior of a human. Developing such models is challenging as current datasets only capture one or two traits of the human expert. For example, if the task at hand is image classification (classifying the images as cancer or non-cancer), the dataset only contains information of what class the images belong to. No information is provided on why the expert reached that conclusion or what features was the expert looking at when the diagnosis was made.

Hand annotation of images is the process of annotating images by humans that can be readable for machines. This process is tedious, time-consuming, and expensive. Humans can annotate general classes more accurately due to spatial reasoning skills but, lacks speed, consistency, and endurance. Completely automated processing systems are fast, but they are unreliable as they do not have a human perception. Most researchers are trying to develop complex systems that are intended to mimic/replace humans. However, these systems do not make use of some of the most defining aspects of a human— "VISION" and "SPEECH"

Deep learning has demonstrated a particularly impressive ability to recognize patterns in data through correlation. But deep learning is fundamentally blind to cause and effect. Furthermore. human involvement is pivotal in fields such as automobile, medical, and military, however current state-of-the-art systems are limited to visual imagery alone and humans turn into passive observers.

Currently, no dataset addresses eye-trackers, speech, and manual annotation information from experts as a single entity. Incorporating such information may be beneficial in helping the AI in all fields to learn more accurately and perceive the task at hand as a human observer would. Hence, the creation of a system that can capture a variety of data is necessary.

Annotated data for AI is a key input to algorithms that comprehend from such data and memorize the information for future prediction. Data collected from multiple sources are usually available in a disorganized format, which is not useful for machines to interpret and understand useful information. But when such data is labeled or curated, it becomes a well-organized dataset that can be used to train the AI model. Understanding the importance of a training set in AI may help in gathering the right quality and quantity of training data. Once it is realized how the data affects the model prediction, a suitable algorithm can be designed as permitted by a training data set's availability and compatibility. Hence, while working with AI, giving priority to annotated data may help in acquiring the best quality of data sets to that can train AI models to mimic the behavior of a human expert.

Current systems only consider the use of vision or manual annotations as separate entities. There exist databases that contain textual information that describe an image, but do not capture the sentiment or the visual cues of the human expert. Examples of such databases include: Correa, Juan Abdon Miranda, et al. "Amigos: A dataset for affect, personality and mood research on individuals and groups." IEEE Transactions on Affective Computing (2018); Berkovsky, Shlomo, et al. "Detecting personality traits using eye-tracking data." Proceedings of the 2019 CHI Conference on Human Factors in Computing Systems. 2019; Berkovsky, Shlomo, et al. "Detecting personality traits using eye-tracking data." Proceedings of the 2019 CHI Conference on Human Factors in Computing Systems. 2019; Kumar, Pradeep, et al. "Multi-modal gait recognition with inertial sensor data and video using evolutionary algorithm." IEEE Transactions on Fuzzy Systems 27.5 (2018): 956-965; Cabrera-Quiros, Laura, et al. "The MatchNMingle dataset: a novel multi-sensor resource for the analysis of social interactions and group dynamics in-the-wild during free-standing conversations and speed dates." IEEE Transactions on Affective Computing (2018).

Apart from databases, few annotation tools have been proposed. Examples of such annotation tools include: Li, Qiang, et al. "Data annotation method and apparatus for enhanced machine learning." U.S. patent application Ser. No. 15/685,854; Hosokawa, Satoshi, et al. "Enhanced annotation tool." U.S. patent application Ser. No. 15/264,646. Huber, Martin, Michael Kelm, and Sascha Seifert. "Method and a system for image annotation." U.S. patent application Ser. No. 12/711,363. Abedini, Mani, et al. "Cloud-based infrastructure for feedback-driven training and image recognition." U.S. Pat. No. 9,760,990. 12 Sep. 2017; Goede, Patricia. "Processing, aggregating, annotating, and/or organizing data." U.S. patent application Ser. No. 15/056,817.

However, no dataset addresses eye-trackers, speech, EEG, and manual annotation information from experts as a single entity. Incorporating such information may be beneficial in helping the AI in all fields to learn more accurately and perceive the task at hand as a human observer would. Hence, the creation of a system that can capture a variety of data is necessary.

In some implementations, the central processing system 110 may use multi-modal sensors to capture the traits and behavior of a human assessing the real-world environments in controlled and uncontrolled settings. Such sensors may include, but are not limited to imaging devices (thermal, biomedical, visible, hyperspectral, multispectral), eye-trackers, EEG and ECG sensors, audio, and manual annotation. More particularly, the present disclosure relates to processing and curating data acquired from a human while analyzing real-world environments.

Additionally or alternatively, in some implementations, the central processing system 110 may combine artificial intelligence (AI), computer vision and eye movement multi-sensory data fusion concepts for cognitive load assessments to help the learner to organize, monitor, interpret and use information captured by human performance monitoring multimedia (image, video, and voice) captured multi-modal devices, such as, but not limited to, wearable eye/gaze trackers.

Additionally or alternatively, in some implementations, the central processing system 110 may take advantage of wearable eye-tracking technology. The advent of wearable eye-tracking technology allows cognitive researchers to record large volumes of eye gaze data while participants are performing tasks. While eye trackers can overlay a gaze indicator on video, recognizing and analyzing the resulting dataset is typically done manually. This procedure is costly, time-intensive, and prone to human mistakes. This analytic difficulty limits the number of scenarios that may be undertaken within budget. This system presents a completely automated eye-tracking data processing method that removes manual annotation. Gaze-to-object classification (GoC) analyses gaze-overlaid video from commercially available wearable eye trackers, identifies and classifies the precise object a user is looking on, and calculates the gaze duration time.

Additionally or alternatively, in some implementations, the central processing system 110 may be configured to perform the following tasks: (i) automatically classify the object under gaze and spatial distribution of gaze over a visual scene, (ii) offer metrics for approximating spatial ability and navigational skill, (iii) automatically estimate cognitive load indicative of the readiness of an individual to solve a problem, and (iv) developing training methodologies to enhance human performance and accelerate knowledge and skill learning capabilities.

The central processing system 110 may find use in various applications, such as audio forensics (voice pitch estimation, speaker identification, and specifically for keyword time-stamping which enables the measurement of response time and delay from a given command to action), Human-Vehicle Interaction (safe driving), human behavior research, gaming, virtual reality, medicine, neuroscience, and human-computer interaction.

Figure 9:
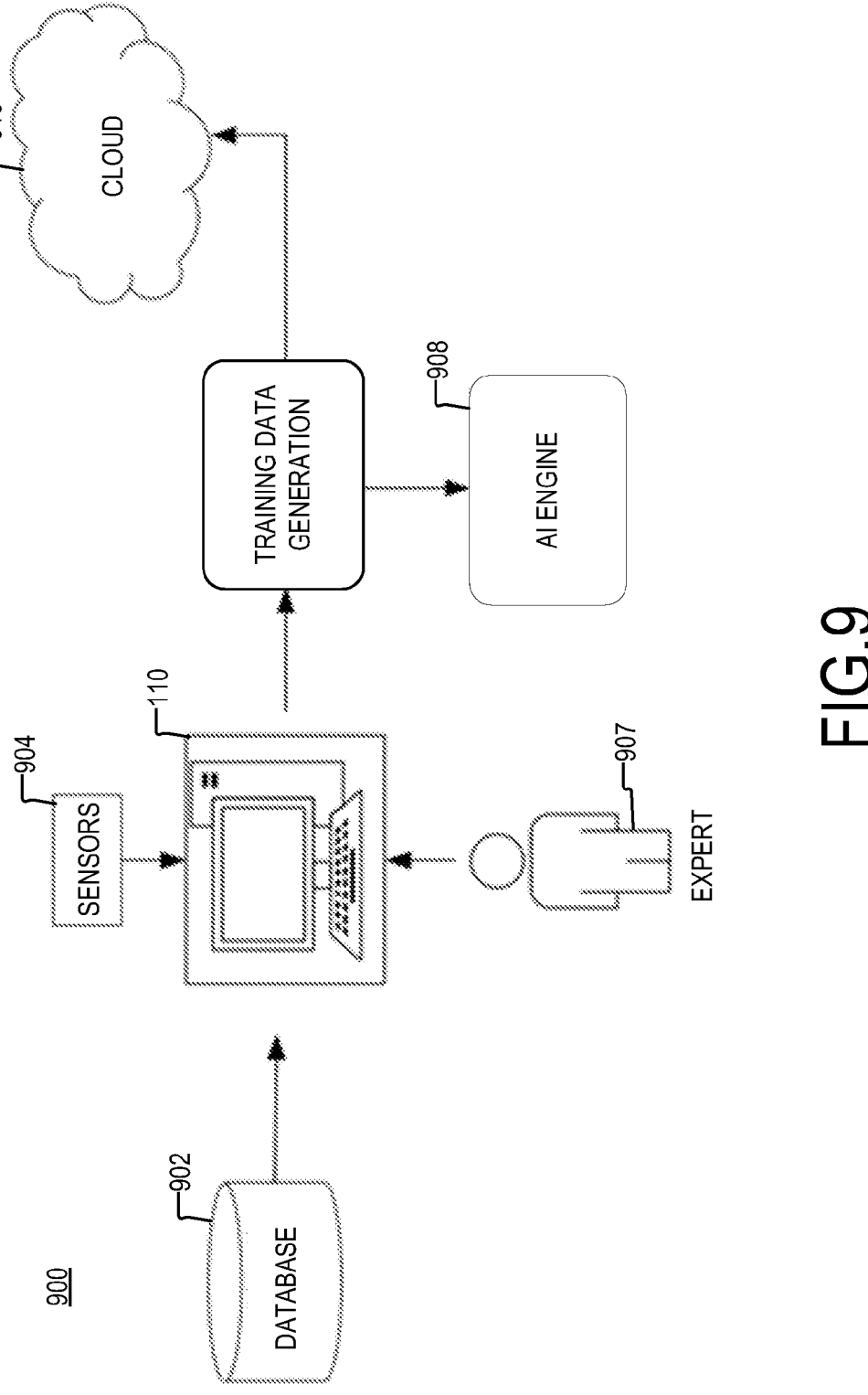
FIG. 9 is a diagram of an example of a system, according to aspects of the disclosure.

FIG. 9 is a diagram of an example of a system 900, according to aspects of the disclosure. The system 900 may include a database 902, one or more sensors 904, the central processing system 110, and a cloud storage 910. In operation, the central processing system 110 may receive sensor data from the sensors 904 and video (or still images) from the database 902. In addition, the central processing system 110 may receive one or more of text input that is provided by an expert 907, audio data that is provided by the expert 907, and eye tracking data of the expert 907 (e.g., data that is indicative of the expert's 907 gaze direction or another gaze characteristic). Next, the central processing system 110 may annotate and curate the received data to generate a training data set. In some implementations, the data that is generated by the sensors 904 may be compared (by the central processing system 110) to data received from the database 902 to generate training labels for the data that is generated by the sensors. Examples of specific techniques for the generation of training labels are discussed further below with respect to equations 1-10. In some implementations, the labels may be generated automatically based on data obtained from the sensors 904. The generated labels and data received from the sensors may form a body of annotated and curated data (or training data). The annotated and curated data may be stored on the cloud storage 910. The annotated and curated data may also be used to train an AI model 1113 (shown in FIG. 11) that is executed by an AI engine 908. The AI model 1113 may be configured to classify a fused data set (or portion thereof), which is generated from the output of multiple sensors, to determine the cognitive state of a user and/or identify an object, which the user's gaze is resting upon. In other words, in some implementations, the AI model 1113 may be configured to classify a fused data set (which is obtained by fusing from the sensors 904), or portion thereof, into one or more categories, wherein each category pertains to a different cognitive state or stress level. In some implementations, when only a portion of the fused data set is classified, the classified portion may include data obtained from multiple sensors, (e.g., the classified portion of the fused data may include two or more of visible range data, an indication of a person's gaze, data from hyperspectral sensor, audio data, etc.).

Figure 10:
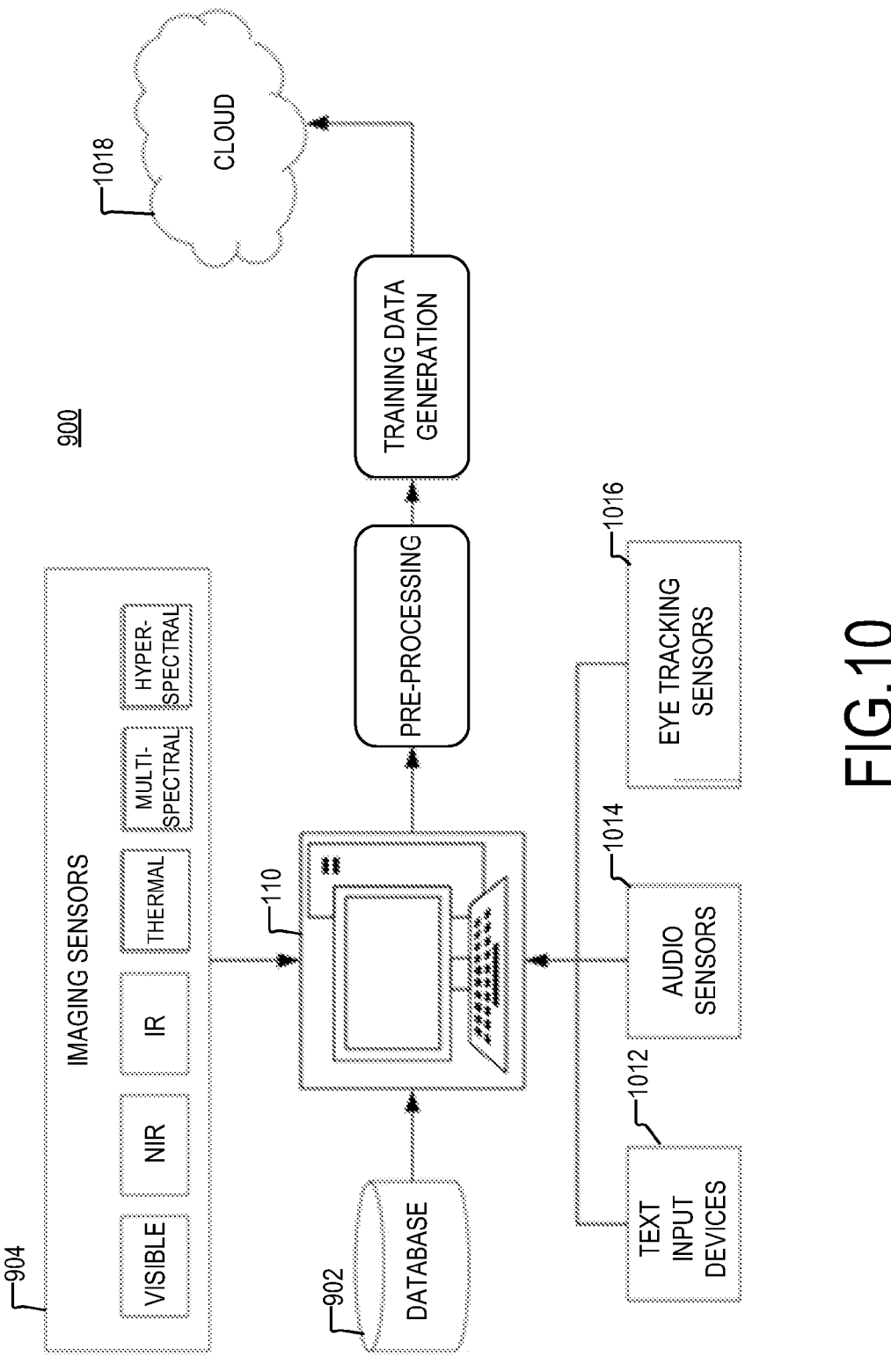
FIG. 10 is a diagram of an example of a system, according to aspects of the disclosure.

FIG. 10 illustrates, shows the system 900, in accordance with one particular implementation. As illustrated in FIG. 10, the one or more sensors 904 may include a visible light sensor (e.g., a visible light camera), a near-infrared light sensor, an infrared sensor, a thermal sensor (e.g., a thermal camera), a multi-spectral sensor, and a hyperspectral sensor. The central processing system 110 may be coupled to one or more text input devices 1012, one or more audio sensors (e.g., microphones) 1014, and one or more eye tracking sensor 1016. The one or more text input devices 1012 may be used to receive text input from the expert 907. The one or more audio sensors 1014 may be used to receive voice input from the expert 907 or input of any other sounds that are produced by the expert 907 (e.g., breathing sounds, etc.). The eye tracking sensors 1016 may be used to receive gaze data from the expert 907 (e.g., data that is indicative of the expert's gaze direction or another gaze characteristic). As illustrated in FIG. 10 before annotating and curating multimedia data, data from sensors 904, and data from any of input devices 1012-1016, the central processing system 110 may pre-process the data. The pre-processing may be performed in the manner discussed above with respect to FIGS. 1-8.

Figure 11:
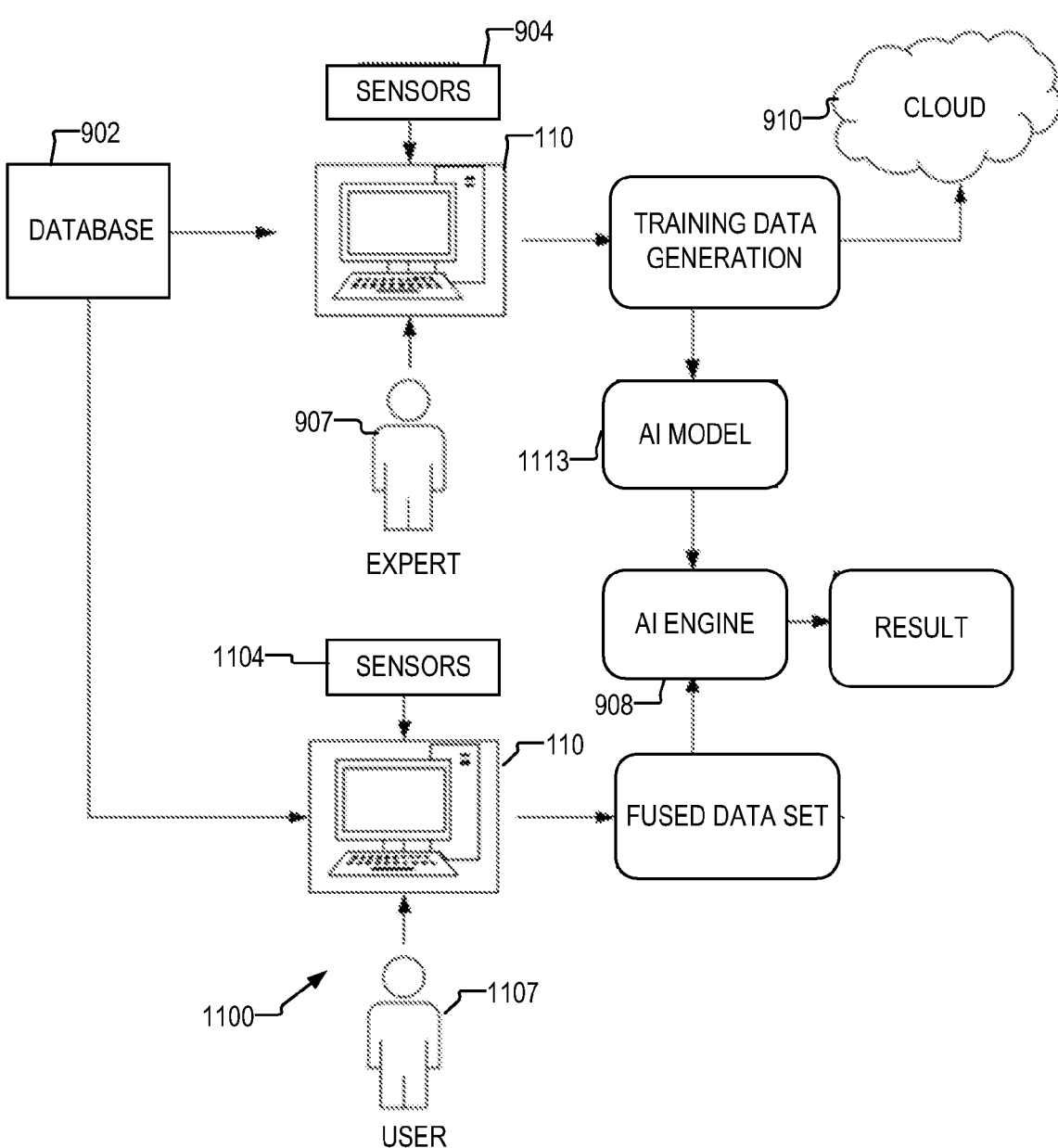
FIG. 11 is a diagram of an example of a system, according to aspects of the disclosure.

FIG. 11 is a diagram illustrating the operation of the central processing system 110. In the example of FIG. 11 the central processing system 110 is depicted twice to indicate that the central processing system 110 may be to train and execute the AI model 1113. FIG. 11 illustrates that sensors 1104 may be provide data to the central processing system 110, which is subsequently pre-processed and fused. Sensors 1104 may be configured to provide data that is associated with the user. Sensors 1104 may be worn on the person of the user 1107 or they may be installed at a location where the user 1107 is positioned. Sensors 1104 may be the same or similar to the sensors 904 (and/or sensors 104 or sensors 504A-B). Each of the sensors 1104 may provide a respective data set to the central processing system 110. The central processing system 110 may fuse the data sets to produce a fused data set. Afterwards, the central processing system 110 may classify the fused data set (or portion thereof) to produce a classification result. In instances in which a portion of the fused data set is classified, the portion may include data obtained from two or more different sensors. The classification result may indicate one or more of: (i) level of stress that is experienced by the user 1107, (ii) performance of the user in fulfilling an objective, (iii) a type or name of an object where the gaze of the user 1107 rests, (iv) performance of the user 1107 in detecting a condition that is visible in an image, (v) a measure of spatial ability and navigational skill of the user 1107, (iv) readiness level of the user, etc.

Figure 12:
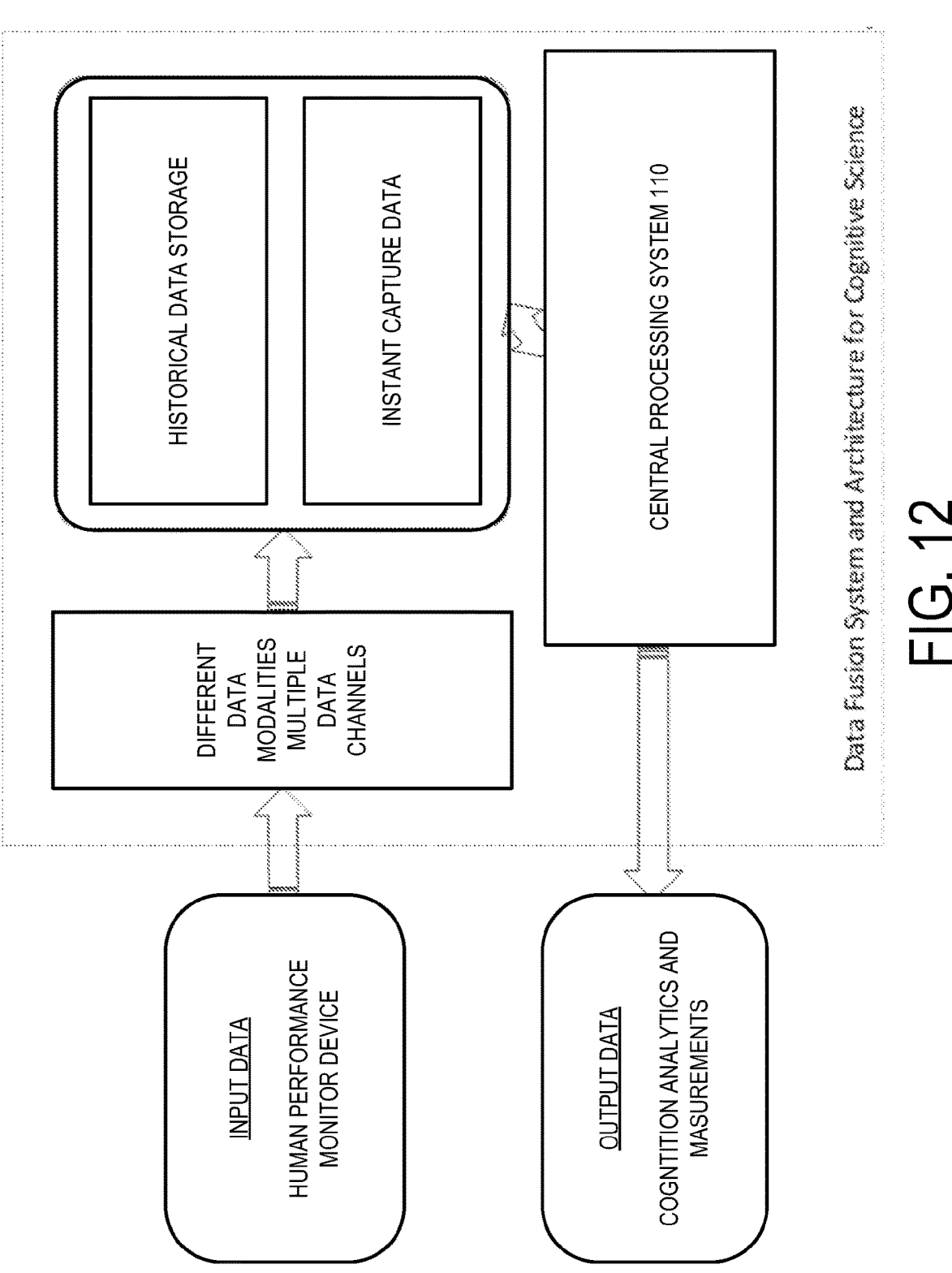
FIG. 12 is a diagram illustrating the operation of a system, according to aspects of the disclosure.

FIG. 12 is a block diagram illustrating the operation of the central processing system 110 in further detail. FIG. 12 illustrates that the central processing system 110 may receive as input, data that is indicative of the state of the expert 907. Such data may include gaze detection data of the expert 907, text input data of the expert 907, audio data of the expert 907, data generated by a camera that is mounted on the person of the expert 907 (or elsewhere), data generated by a MR sensor that is mounted on the person of the expert 907 (or elsewhere), data generated by an IR sensor that is mounted on the person of the expert 907 (or elsewhere), data generated by a thermal camera that is mounted on the person of the expert 907 (or elsewhere), data generated by a multi-spectral sensor that is mounted on the person of the expert 907 (or elsewhere), data generated by a hyperspectral sensor that is mounted on the person of the expert 907 (or elsewhere), multimedia (e.g., map data that is stored in the database 902, video data of the same location that is represented in a live video feed that is provided to the system 100), etc.. As can be readily appreciated, the input data may have different data modalities. The input data may be placed in storage for a later review, or it can be processed by the central processing system 110. As a result of processing the input data, the central processing system 110 may generate output data including cognition analytics and measurements for the user. The output data, in some implementations, may be the same or similar to the classification result that is discussed above with respect to FIG. 11. In some implementations, the entire input to the central processing system 110 may be collected by human performance monitor devices. Such devices can provide data in several modalities (with no limit on the number of modalities). Both historical and real-time data are sent to the central processing system 110. The central processing system 110 may use artificial intelligence, computer vision, and machine learning, to forecast and report cognition analytics measures based on historical and real-time data.

Figure 13B:
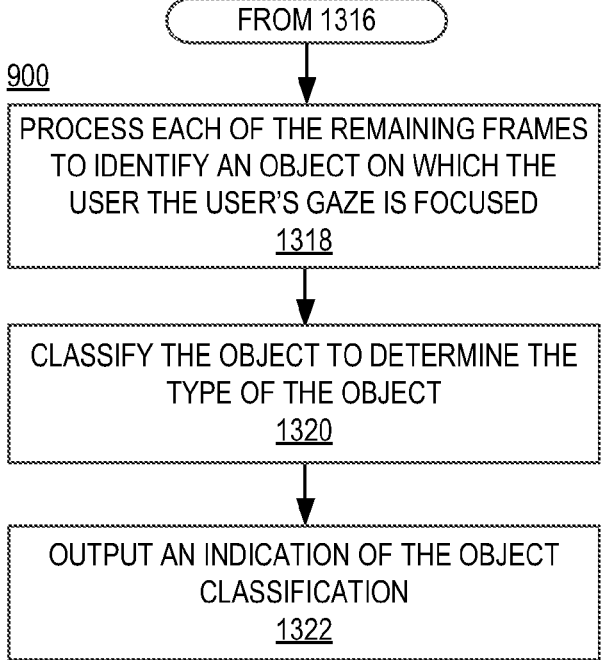
FIG. 13B is a flowchart of an example of a process, according to aspects of the disclosure.

FIGS. 13A-B show a flowchart of a process 1300, according to aspects of the disclosure. At step 1302, the central processing system 110 receives video data that is captured by an IR camera. The IR camera, according to the present example, is pointed towards one (or both eyes) of the user 1107. The IR camera, according to the present example is worn on the person of the user 1107. The data that is received from the IR camera captures the pupil movement(s) of the user. At step 1304, the central processing system 110 executes a human attention prediction algorithm based on the data that is received from the IR camera, and determines a gaze point of the user 1107. At step 1306, the central processing system 110 receives video that is captured by a visible range camera. The visible-range camera, according to the present example, is worn on the person of the user 1107. The video that is captured by the visible range camera shows the field of view of the user 1107. At step 1308, the central processing system 110 generates a gaze overlaid scene video. The generated video may include a plurality of frames. Each frame in the video may show the field of view of the user 1107 at a particular time instant, and include a marker that shows the point (in the field of view) where the user 1107 is looking (i.e., the point towards which the gaze of the user is oriented). At step 1310, the central processing system 110 performs video-to-frame conversion on the gaze overlaid scene video. As a result of the conversion, the central processing system 110 generates a plurality of separate files (or objects), wherein each of the files (or objects) is a different frame of the gaze overlaid scene video. At step 1312, the central processing system 110 determines a respective quality metric for each of the frames (obtained at step 1306). At step 1314, the central processing system 110 generates a reduced frame set based on the quality metrics (determined at step 1312). Generating the reduced frame set includes: (i) comparing the respective quality metric of each frame to a threshold value, and (ii) deselecting all frames whose quality metric is below the threshold. At step 1316, the central processing system 110 removes redundant frames from the reduced set (generated at step 1314). Removing redundant frames may include: (i) for any given frame in the reduced set, calculating a respective similarity score, wherein the similarity score measures a degree of similarity between the given frame and another frame in the reduced set that immediately precedes the given frame, and (ii) deleting frames in the reduced set whose respective similarity score exceeds a threshold. At step 1318, the central processing system 110 processes each of the frames to identify an object that the user 1107 is looking at. The identified object may be one over which the gaze marker is superimposed. As a result of executing step 1318, the central processing system 110 may generate a feature vector corresponding to the object. At step 1320, the central processing system 110 classifies the object (identified at step 1318). In some implementations, the classification may be performed by evaluating a neural network based on the object signature (obtained at step 1320). As a result of the classification, the central processing system 110 may obtain a string or a number that identifies the type of object the user is looking at. At step 1322, the central processing system 110 outputs an indication of the output of the classification. For example, if the central processing system 110 determines that the object gazed by the user is a fire escape, the central processing system 110 may output the string "fire escape."

In some respects, the process 1300 may be used to identify and mark an image in the version of the image 600A that is output on the display of the central processing system 110 or the headset display of a firefighter. As illustrated in FIG. 6C, the central processing system 100 may identify and output a marker 1352 that marks the object where the gaze of a user rests (e.g., firefighter F2). In addition, the central processing system 1352 may output a label 1354 that identifies the object where the user's gaze rests. As illustrated, FIG. 6B shows both user F2 and the marker 1352 of the gaze point of the user F2. In this regard, FIG. 6C illustrates that an image that is marked with a marker identifying the gaze point of a user may be generated by a camera that is not worn by the user. In other words, the central processing system 110 may use computer vision to cross-reference objects that are identified in first-person images of a user with third-person images of the same user in order to provide situational awareness to third-party observers of the state of the user.

Section 5: Annotation and Training Tool for Use in Dentistry

The central processing system 110 may be used to implement a training/learning system and method wherein acquired data is used to train the AI model. The AI model is further used as a training tool where trainees follow the same data acquisition procedure. Although the AI model is described in the context of dentistry it will be understood that the AI model may be used in any context where it is desirable to assess how a person processes an image (or a situation) they are observing. For example, the AI model may be used in the training of pilots or machine operators.

Figure 14:
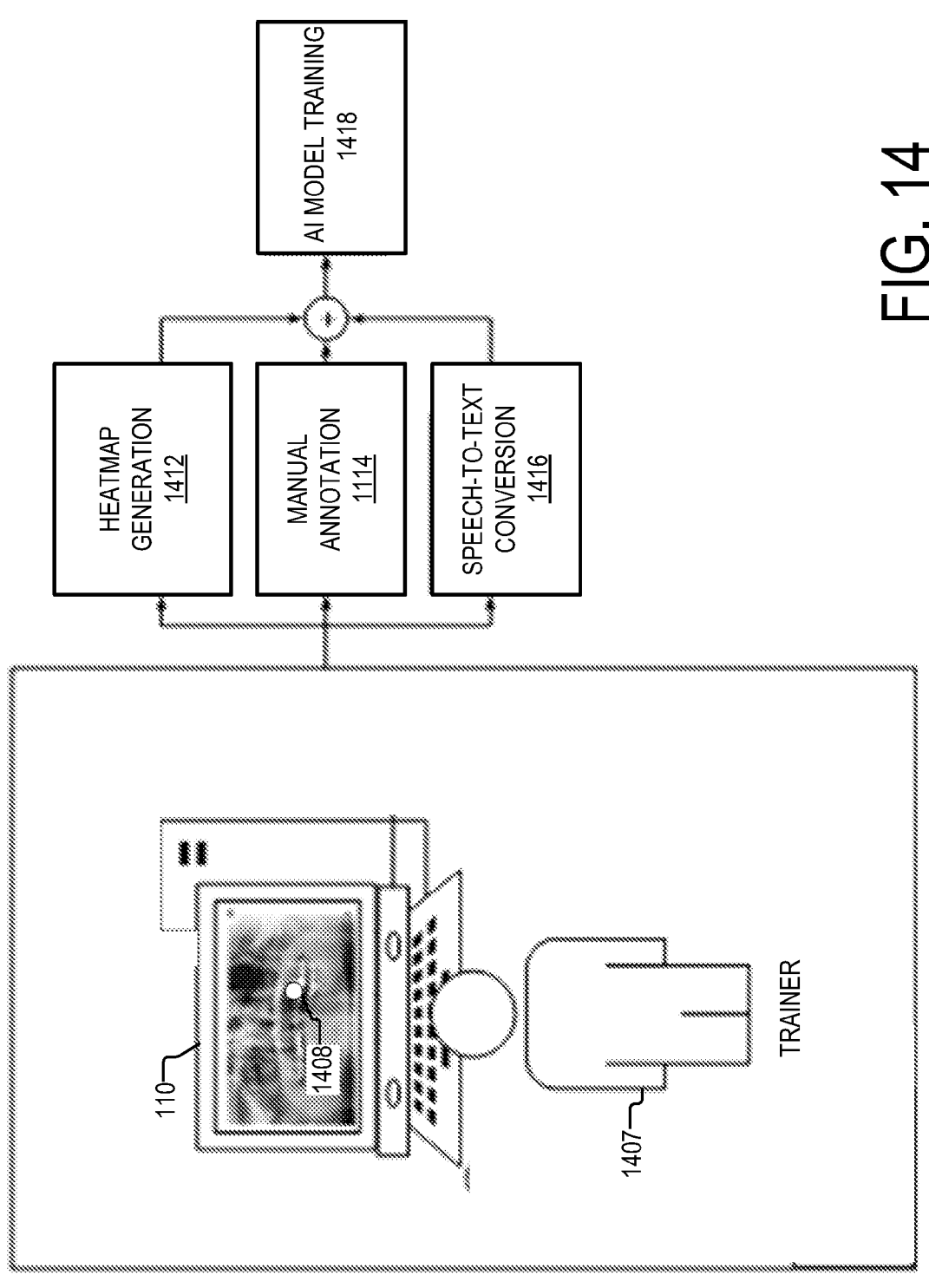
FIG. 14 is a diagram of an example of a system, according to aspects of the disclosure.

Shown in FIG. 14 is the central processing system 110 when being used by a trainer 1407 to generate training data for a neural network that assesses the performance of a dental student. The central processing system 110 is configured to display a dental X-ray image. The trainer may observe the X-ray image. In addition, the trainer 1407 may manually annotate the X-ray image (or record text notes associated with the X-ray image). Furthermore, the trainer 1407 can speak comments regarding the X-ray image. More particularly, FIG. 14 shows an example of a process 1410 for training an AI model for evaluating student performance. At step 1412, the central processing system 110 generates a heat map of an X-ray image that identifies the distribution of the trainer's 1407 gaze across the X-ray image. At step 1406, the central processing system 110 may obtain any manual annotations that are made to the X-ray image by the trainer 1407. The manual annotations may be entered into the central processing system 110 by using one or more input devices of the central processing system 110. At step 1416, the central processing system 110 generates a text transcript of words that are spoken by the trainer 1407 while his or her gaze is fixed at the location in the X-ray image that is marked by the marker discussed with respect to step 1412. At step 1418, the data generated at steps 1412-1416 is used to train an AI model.

In some implementations, eye-tracking information may be captured using the Tobii Eye Tracker 4C module, the video of the trainer's (or student's) field of view may be captured by using a Logitech™ web camera, the audio of the student's speech may be captured using a microphone, and the labeling (or annotation) of the regions of interest in any given X-ray image may be performed using the Labelbox user interface. Labelbox is one of many annotation tools that can be utilized to manually annotate data.

The raw data captured from these disparate sources are further processed, making it feasible to train an AI model. The audio can be converted using an off-the-shelf speech-to-text converter (e.g. google translate). But when working with medical data and terminology, the accuracy of the speech-to-text converter reduces. Neural network architectures are at the core of powerful automatic speech recognition systems (ASR). However, while recent research has focused on novel model architectures, the acoustic input features remain almost unchanged. Traditional ASR systems rely on multidimensional acoustic features such as the Mel filter bank energies alongside the first, and second order derivatives to characterize timeframes that compose the signal sequence. Considering that these components describe three different views of the same element, neural networks must learn both the internal relations that exist within these features, and external or global dependencies that exist between the timeframes. According to the present example, a Hypercomplex based neural network architecture may be used for the AI model, which is capable of understanding and learning such relations in multidimensional spaces.

In traditional convolutional neural networks (CNN's), the audio data used as input is broken down into segments and passed to the neural network. Although effective, breaking the audio into smaller segments can lead to a loss in the relationship between each segment. Hypercomplex systems can not only be used to preserve this relationship, but also extract information related to sentiment. An example of a hypercomplex system used for phoneme recognition is described in T. Parcollet et al., "Quaternion convolutional neural networks for end-to-end automatic speech recognition," arXiv preprint arXiv:1806.07789, 2018. The present disclosure may further the use of a higher valued (e.g. octonion) complex neural network to convert speech-to-text.

An octonion number x is a hypercomplex number, which is an extension of a complex number and a quaternion number, consists of one real part and seven imaginary parts:

$$x = x_0 e_0 + x_1 e_1 + x_2 e_2 + x_3 e_3 + x_4 e_4 + x_5 e_5 + x_6 e_6 + x_7 e_7 \in O$$

where O denotes the octonion number field, $x_i \in R$, i=1, 2, ... ,7 (R denotes the real number field), $e_0=1$, and $e_i$, i=1, 2, ... ,7, are seven imaginary units obeying the following rules:

$$\begin{cases} e_i^2 = -1 \\ e_i e_j = -e_j e_i \neq e_j e_i \\ (e_i e_j) e_k = -e_i(e_j e_k) \neq e_i(e_j e_k) \end{cases}, \forall\, i \neq j \neq k, 1 \leq i, j, k \leq 7,$$

For a complete review of the properties of octonion, refer S. Okubo, Introduction to Octonion and other Non-Associative Algebras in Physics. Cambridge University Press, 1995.

As the octonion neural network requires 1 real and 7 imaginary inputs, the audio feed may be split the audio feed into 8 parts, to provide a higher correlation between samples. The generated text may be stored in the required format. To further improve the conversion, an activation function for hypercomplex networks may be used. It is defined as:

$$f(\alpha, x) = \begin{cases} -\dfrac{\log_e(1 - \alpha(x + \alpha))}{\alpha} & \text{for } \alpha < m \\ x & \text{for } \alpha = 0 \\ \dfrac{e^{\alpha x} - 1}{\alpha} + \alpha & \text{for } \alpha > m \end{cases}$$

The activation function interpolates between logarithmic, linear, and exponential functions. Although it is spliced together, it is continuous both with respect to a and with respect to x and has several properties that render it particularly useful as a hypercomplex neural network activation function. The function $f$ may be referred to as "the soft" exponential activation function.

Figure 15:
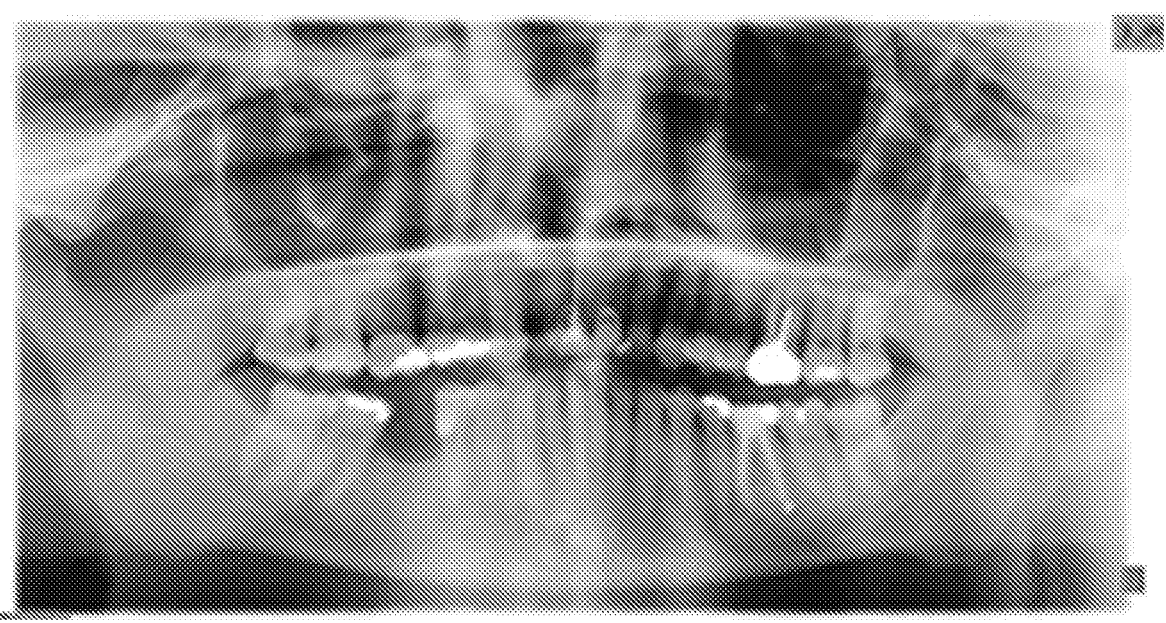
FIG. 15 shows an example of an X-ray image, according to aspects of the disclosure.
Figure 16:
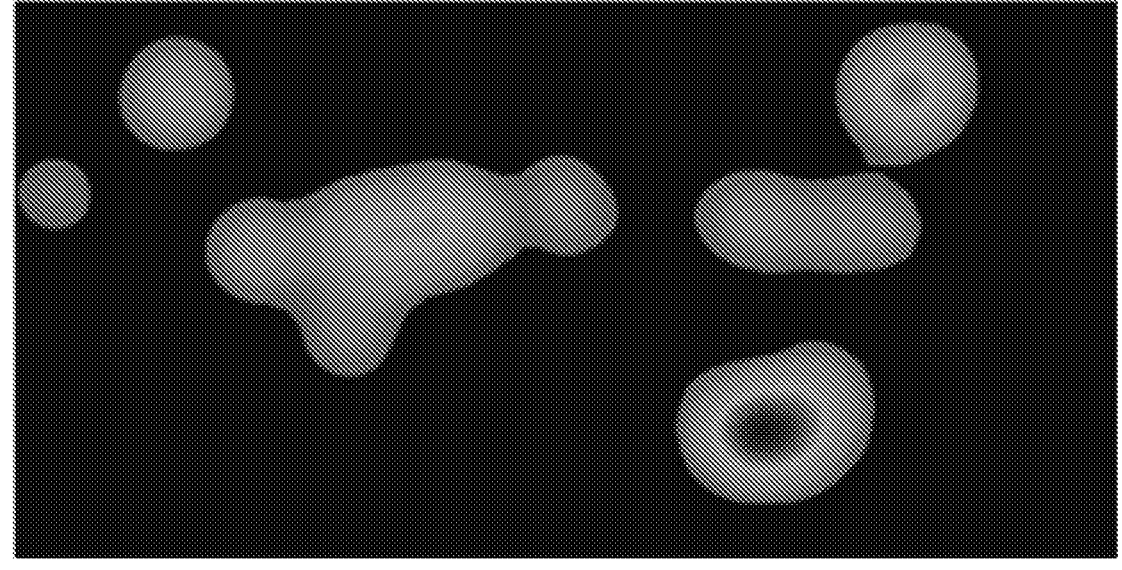
FIG. 16 shows an example of a heatmap that is associated with the X-ray image of FIG. 15, according to aspects of the disclosure.

The information acquired from the Tobii Eye Tracker 4C module may be processed using off-the-shelf methods to generate a heat map. The heatmap highlights areas focused/concentrated on by the users. An example of a dental panoramic image is shown in FIG. 15. And an example of a respective heat of the dental panoramic image is shown in FIG. 16. In some respects, the heatmap may be regarded as a fused data set because it identifies gaze points of the trainer 1407 (or another user) in the coordinate system (of the user's field of view) or a specific image or scene that is being observed by the user.

Ongoing research currently focuses on using the eye-tracker as a "guide" that indicated what the user is looking at. An example of such art is illustrated in J. Stember et al., "*Eye Tracking for Deep Learning Segmentation Using Convolutional Neural Networks,*" *Journal of digital imaging,* vol. 32, no. 4, pp. 597-604, 2019. The present disclosure focuses on capturing the "expertise" of the user by tracking their eye movements to analyze and trace what they looked at and what they focused on primarily.

Initially, manual annotation was employed to label regions of interest. Once the AI model is trained, the manual annotation process may be replaced by automated annotation using the eye-tracker (similar to the process mentioned in J. Stember et al., "*Eye Tracking for Deep Learning Segmentation Using Convolutional Neural Networks,*" *Journal of digital imaging,* vol. 32, no. 4, pp. 597-604, 2019). For training, the hypercomplex neural network architecture may be used, similar to the process used for speech-to-text conversion. With these processed data, the AI model may be accurately trained to mimic the expertise of a human. Using the acquisition system, an AI-based education tool may be used to help practitioners and students assess and evaluate their findings and provide valuable feedback. The general concept of the tool is illustrated in FIG. 17.

Figure 17:
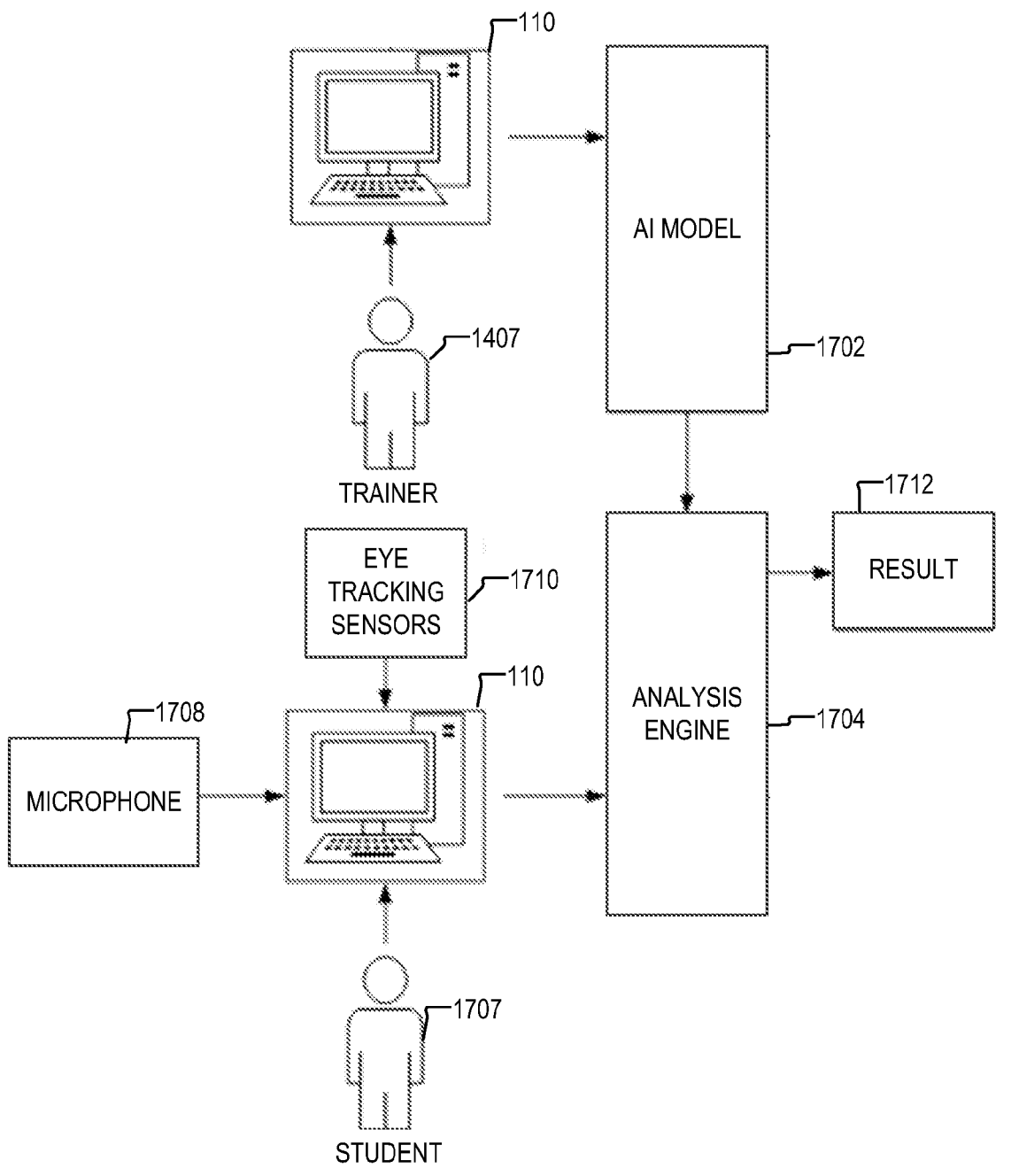

FIG. 17 is a diagram illustrating the operation of the central processing system. In the example of FIG. 11 the central processing system 110 is depicted twice to indicate that the central processing system 110 may be to train and execute an AI model 1702. The model 1702 may include a Hypercomplex based neural network architecture, and/or any other suitable type of neural network. The AI model 1702 may be implemented by using an AI engine 1704. The AI engine 1704 is executed on the central processing system 110. The AI model may be configured to classify the trainer's 1407 performance into one of a plurality of categories (e.g., {'A', 'C', 'D'. and 'F'} or {poor, average, excellent}, etc.) The AI model may use an OCNN that is configured in the manner discussed below.

The central processing system 110 may be coupled to one or more eye-tracking sensors 1710 and a microphone 1708. The central processing system 110 may display a dental X-ray image (or any other type of image) to a student 1707. In some implementations, the AI model may be configured to classify the student's 1707 performance into one of a plurality of categories that describes a level of performance in detecting a condition that is evident from the X-ray image (e.g., root inflammation). While the central processing system 110 is presenting (e.g., displaying) the X-ray image to the student, the system 110 may track the student's 1707 gaze with the sensors 1710, and record any speech that are spoken by the student 1707. The central processing system 110 may generate a heat map of the X-ray which indicates the distribution of the student's gaze over the X-ray image. For example, the heatmap may identify a plurality of points in the X-ray image, and for each point (or region), the heatmap may provide the value of a particular gaze measure (e.g., gaze resting time, etc.). For example, the heatmap may identify the relative duration of time the student has spent looking at each point (or region). As another example, the heatmap may identify the amount of attention paid by the student to each point (or region). As yet another example, the heatmap may identify whether the student's attention was attracted to parts of the X-ray image that show the symptoms of a disease.

The central processing system 110 may further generate a signature of the student's 1707 interactions with the central processing system 110. The signature may include one or more of: (i) a representation of the heatmap, (ii) a representation of the text transcript, and (iii) a representation of one or more annotations that are made on the X-ray image by the student. Afterwards, the system 110 may classify the vector with the AI engine 1704 to obtain a result 1712. The result 1712 may evaluate the performance of the student 1707 in diagnosing a condition that is visible in the X-ray image and/or the general quality of interaction of the student 1707 with the X-ray image.

Important for the correct operation of the central processing system is the training of the AI model using the audio, annotation, and eye-tracking information acquired from the trainer 1407. The AI model used in training can be any off-the-shelf architectures, such as CNN's, RNN's, or a combination of different architectures. Once the required accuracy is achieved by the AI model, it can then be deployed as a stand-alone expert system. The concept of this training tool is to evaluate or assess the differences (if any) between the expert and the student in reading and understanding the data.

Figure 18:
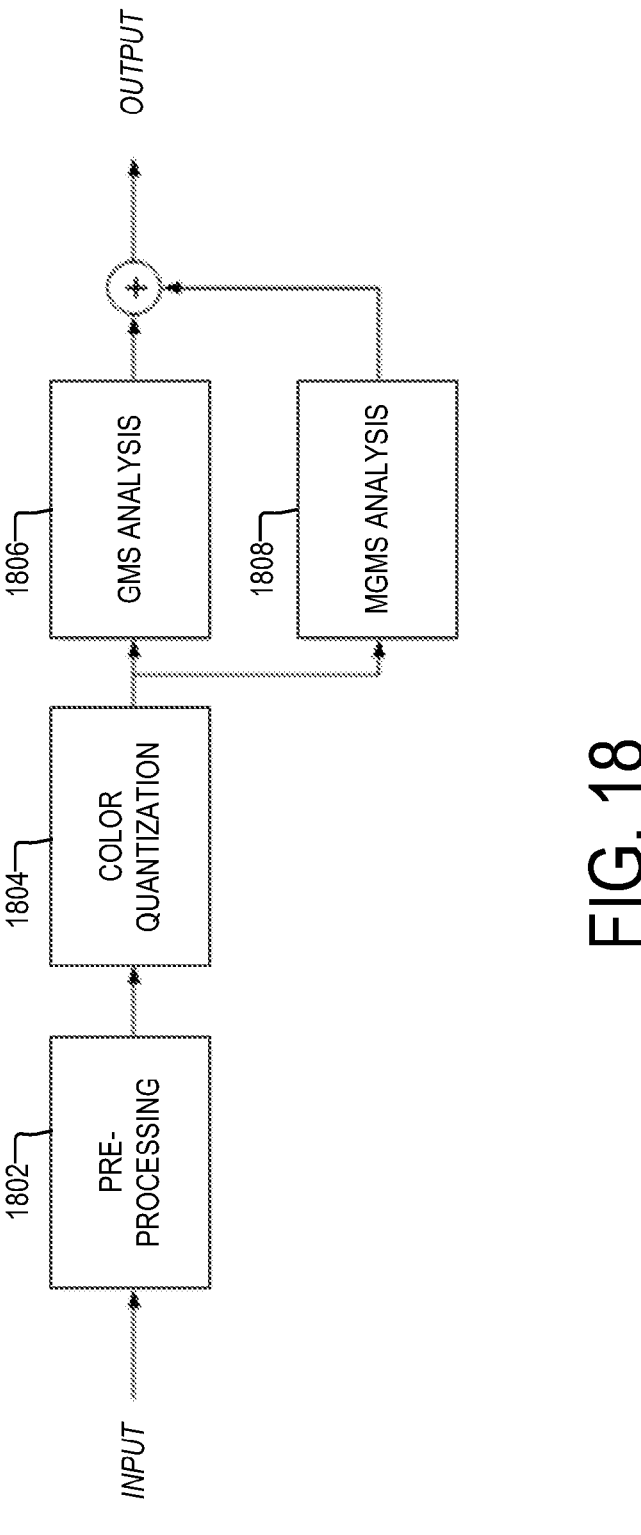
FIG. 18 is a diagram of an example of a system, according to aspects of the disclosure.

In some implementations, the central processing system 110 may compare the gaze heatmap of the trainer 1407 to a gaze heatmap of a trainer when executing the AI model 1702. FIG. 18 shows an example of a process 1800 for generating GMS and MGMS scores. These scores may be used by the AI model 1702 in the classification of data that is associated with the student 1707. Specifically, the GMS score and/or the MGMS score for a heatmap of the student 1707 may be combined with neural networks that compare the student's annotations and comments to those of the trainer 1407.

According to the process 1800, heatmaps of the student are initially preprocessed (1802) and color quantized (1804) using off-the-shelf algorithms. The preprocessing step ensures that the heatmaps are normalized/standardized for accurate analysis and the color quantization step splits the heatmap into multiple segments. Next, the GMS and MGMS scores are calculated (1806 and 1808) in accordance with equations 1 and 2 below. Equation 1 combines the pixel level information and its global position (e.g., position represented by x and y coordinates), generating a standardized value of accuracy.

$$GMS = \left\{ \sum_m \left\{ \alpha * \left[ \sum_{i=1}^{n} |x_i - y_i|^2 \right]^{\frac{1}{2}} + (1 - \alpha) * \left[ \frac{2 * |A \cap B|}{|A| + |B|} \right] \right\} \right\}^{\frac{1}{m}} \quad \text{Eq 1}$$

where $\alpha$ denotes an optimized parameter and $x_i$ and $y_i$ are the centroids of the instances A and B given by $$x = \frac{1}{n} \sum_{k=1}^{n} x_k \text{ and } y = \frac{1}{n} \sum_{k=1}^{n} y_k.$$

In situations where higher accuracy is needed, we use a multilevel version of the GMS (MGMS) measure.

$$MGMS = \frac{\sum_{i=1}^{n} w_i * GMS_i}{\sum_{i-1}^{n} w_i} \quad \text{Eq 2}$$

where $w_i$ denotes parameterized weights for each level. The standard arithmetic operations (addition, subtraction, multiplication, and division) can be replaced with Parameterized Logarithmic Image Enhancement (PLIP) operation, described in K Panetta, S. Agaian, Y. Zhou, and E. J. Wharton, *"Parameterized logarithmic framework for image enhancement,"* IEEE Transactions on Systems, Man, and Cybernetics, Part B (Cybernetics), vol. 41, no. 2, pp. 460-473, 2010. Operations performed in the logarithmic space provide a wider range of values to manipulate, which in turn improves accuracy.

Section 6: Evaluating the Performance of Soldiers

The central processing system 110 may also be used to implement a tool for assessing the cognitive load that is being placed on soldiers who are deployed in the field. The tool may be used in training and evaluating the performance of soldiers. The tool presented here may augment the present training methods, resulting in higher precision training. As in the previous use case, the tool needs to be trained first. Training the tool involves training an AI model based on collected data. After the tool is trained, the tool may be used to classify data acquired from a soldier in a real-world scenario by using similar techniques to those discussed with respect to FIGS. 14-18. In the present example, the tool considers the inputs from the eye-tracker, an audio recording device, and a visible camera.

As mentioned, the tool may capture the expertise using an eye-tracker, a visible camera, and an audio recording device and compare it to the outputs of the trainee. For the audio, the tool may use state-of-the-art algorithms to compare the two outputs. The audio is used to analyze breathing patterns and commands to deduce stress levels encountered during training. The hypercomplex architecture mentioned above can be used in this scenario.

The information acquired from the eye-trackers is processed using off-the-shelf methods to generate a heat map. The heatmap highlights areas focused/concentrated on by the users. In contrast to the heatmaps generated in the dental case, the heatmaps generated for this application are more accurate and refined to a single point. For example, the heatmap may identify a plurality of points in the field of view of a soldier (and/or any other person), and for each point (or region), the heatmap may provide a particular gaze measure. For example, the heatmap may identify the relative duration of time spent by the soldier looking at different portions of his or her surroundings. As another example, the heatmap may identify the amount of attention paid by the soldier to a particular portion of his or her surroundings. As another example, the heatmap may identify whether the soldier exhibited a specific cognitive response to a given portion of his or her surroundings.

In the present example, the tool may use two localized measures that can be used to accurately match the heatmaps.

The first method is the Alpha (α)—winsorized matching method. The matching coefficient 'It' is given by $$R = \frac{\sum_m \sum_n (A_{mn} - \vec{A})(B_{mn} - \vec{B})}{\sqrt{\sum_m \sum_m (A_{mn} - \vec{A})^2 \left(\sum_m \sum_n B_{mn} - \vec{B}\right)^2}} \qquad \text{Eq 3}$$

Where $\vec{A}$, $\vec{B}$ are the α—winzorized mean values of regions A and B given by $$\alpha WinMean(X_1, X_2, X_3, \ldots, X_N; \alpha) = \qquad \text{Eq 4}$$

$$\frac{1}{N}\left(\alpha N.X_{(\alpha N+1)} + \sum_{i=\alpha N+1}^{N-\alpha N} X_{(i)} + \alpha N.X_{(N-\alpha N)}\right);$$

The value of α can be obtained in the following manner $$\alpha_1 = \mu(A) - \sigma(A) \qquad \text{Eq 5}$$

$$\alpha_2 = \mu(A) + \sigma(A) \qquad \text{Eq 6}$$

Where, μ is the mean and a is the standard deviation.

The second method is the weighted rank order matching method. In this method, weights are assigned to each element in the localized region. The value of the weights decides how many times each element in the region is repeated. Hence, the weighted rank order statistics is given by $$WROS(X_1, X_2, \ldots, X_N; \text{weight, rank}) = \qquad \text{Eq 7}$$

$$r^{th} \text{ order statistic of } \{a_1 \diamond X_1, a_2 \diamond X_2, \ldots, a_N \diamond X_N\}$$

Using these values, the correlation constant 'R' is obtained from the Eq 3.

Figure 21:
FIG. 21 is diagram of an example of a pair of underwater images, according to aspects of the disclosure.
Figure 21:
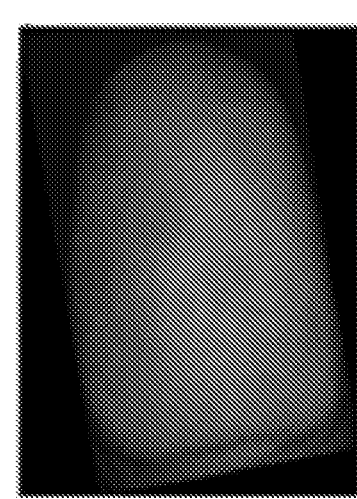
Figure 22:
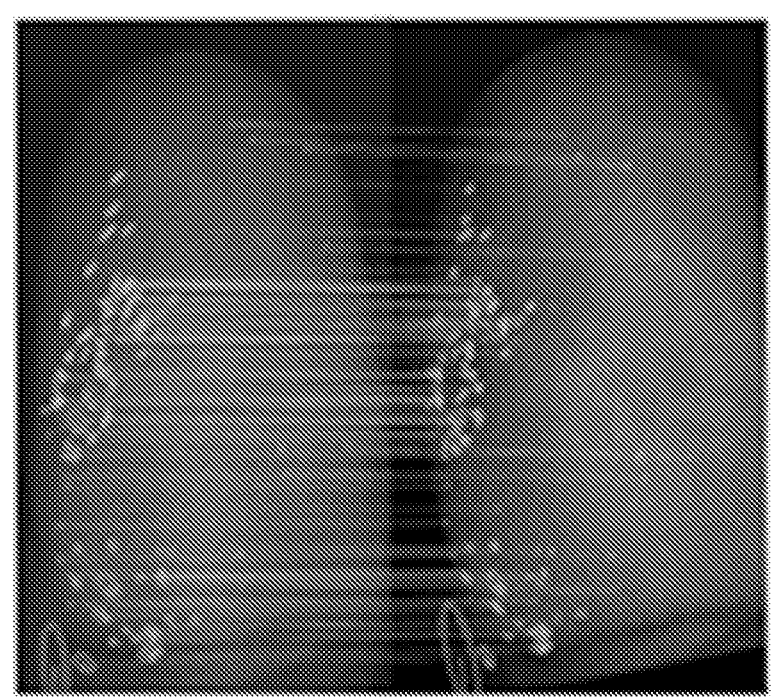
FIG. 22 shows matching features in the images of FIG. 21, according to aspects of the disclosure.

These measures utilize the basic concept of correlation and further refine it to be applicable to matching two or more heatmaps. FIGS. 21 and 22 illustrate the use of the two measures. FIG. 21 illustrates two images of underwater images. FIG. 22 illustrates matching features in the two images of FIG. 21, which can be identified by using. The measures described in Eq 1 and Eq 2 can also be used for this case.

Figure 20:
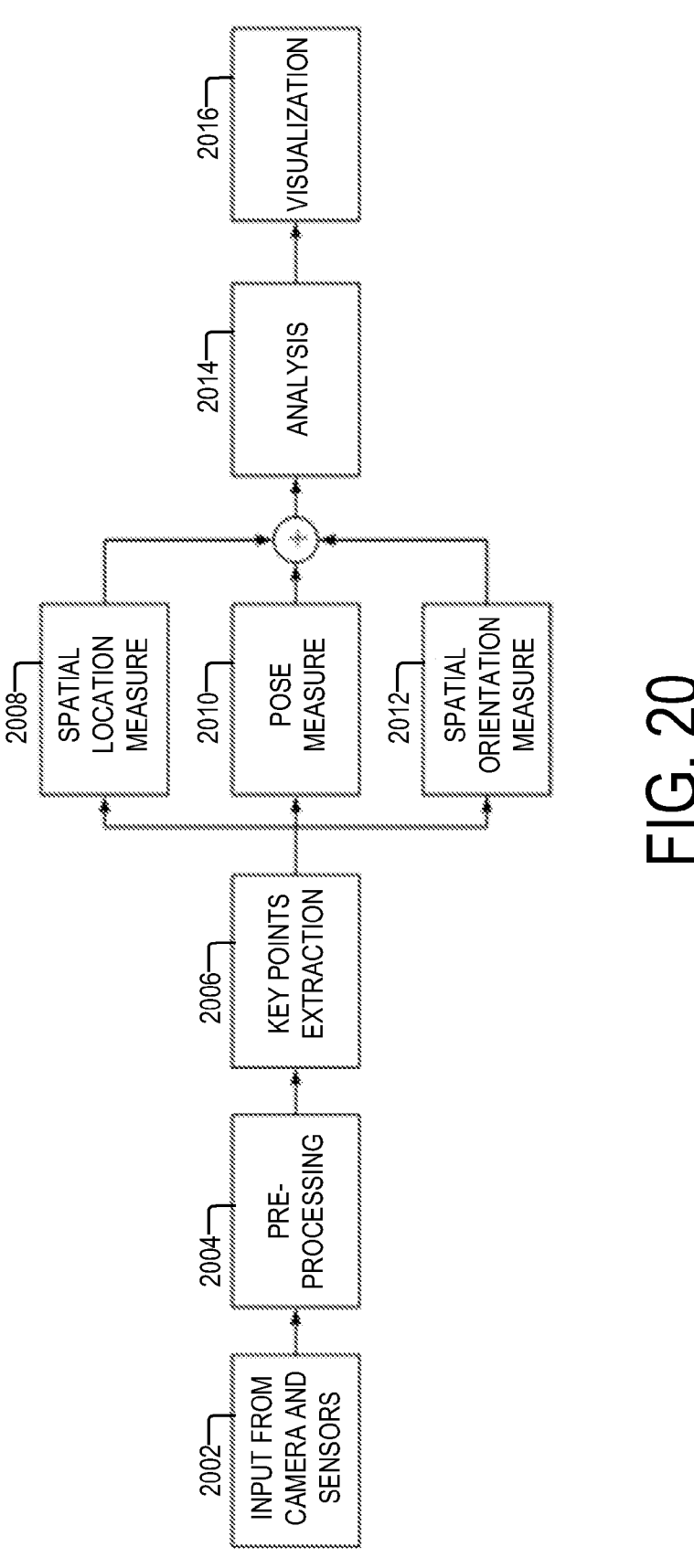
FIG. 20 is a flowchart of an example of a process, according to aspects of the disclosure.

The final piece to this training tool is the pose matching measure. The flow diagram of the process is seen in FIG. 20. For this application, we consider the input from a single visible camera, but multiple sensors can be used for this scenario. In the acquisition phase, the pose of the expert and the trainee can be estimated using any off-the-shelf algorithm. The pose is further preprocessed to acquire key feature points. Based on these feature points, the tool may use a measure that accurately estimates the differences between the expert and the trainee. The measure is a combination of three key features, namely, spatial location, pose, and spatial orientation. The measure is defined as:

$$\text{Pose Measure} = \text{Spatial location} + \text{Pose Score} + \text{Spatial oreintation} \qquad \text{Eq 8}$$

The measure is a combination of features, but the trainee can be evaluated on each individual feature. Based on the training process, the Pose Measure can be parameterized to focus on certain features. This is defined as:

$$\text{Pose Measure} = \qquad \text{Eq 9}$$

$$\alpha * \text{Spatial location} + \beta * \text{Pose Score} + \gamma * \text{Spatial oreintation}$$

where α+β+γ=1. The Spatial Location, Pose Score, and Spatial Orientation can be calculated using different distance measures. An example of such a measure is the Euclidian distance defined as:

$$d(x,y,z) = \sqrt{(x_2-x_1)^2 + (y_2-y_1)^2 + (z_2-z_1)^2} \qquad \text{Eq 10}$$

The Pose Score can be estimated using either the Voronoi or Delaunay triangulation technique as described in A. Ortega, P. Frossard, J. Kovačević, J. M. Moura, and P. Vandergheynst, "Graph signal processing: Overview, challenges, and applications," Proceedings of the IEEE, vol. 106, no. 5, pp. 808-828, 2018. The tool may utilize first order and second order derived scores (entropy, area, perimeter, etc.) to accurately measure the pose. The spatial orientation can be obtained from various sources. For example, the eye-tracker provides us with a heading, which can be utilized to estimate the difference in orientation. Another example is the use of an Inertial Measurement Unit (IMU), which can be used to accurately measure the orientation. With a combination of these key features, an accurate of estimate the differences (if any) between the expert and the trainee can be obtained.

Figure 19:
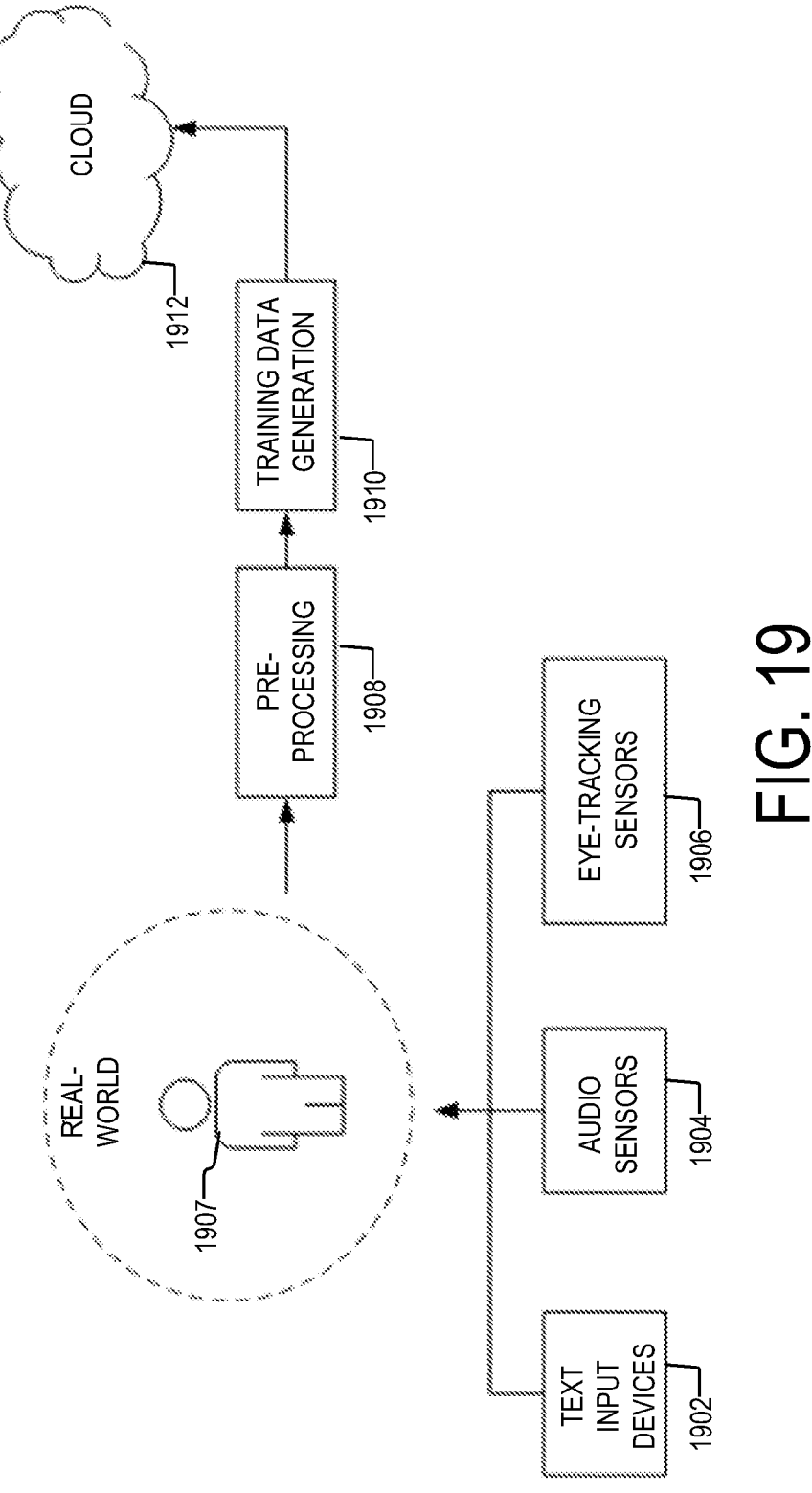
FIG. 19 is a flowchart of an example of a process, according to aspects of the disclosure.

FIG. 19 illustrates an example of a process 1900 for collecting data from sensors and devices that are worn on the person of a soldier 1907 who is deployed in the field. As illustrated, the sensor may be equipped with one or more text input devices, one or more audio sensors, and one or more audio tracking sensors. At step 1902, the central processing system 110 receives data from the text input devices. At step 1904, the central processing system 110 receives data from the audio sensors. At step 1906, the central processing system receives data from one or more eye-tracking sensors. At step 1908, the central processing system 110 performs pre-processing on the data received at steps 1902-1906. At step 1910 the central processing system 110 generates a training data set by annotating and curating the data. Afterwards, the training data set is stored in cloud storage 1912. The annotated and curated data may be used to train an AI model for determining the cognitive load that is being experienced by the soldier.

FIG. 20 illustrates an example of a process 2000, according to aspects of the disclosure. At step 2002, a set of input data is received. The input data may be generated by one or more cameras and one or more sensors (e.g. a gaze tracker, etc.). The input data may be generated, at least in part, by a camera that is worn on the person of a soldier or a camera that is arranged to film the soldier while the soldier is deployed. The input data may be generated, at least in part, by sensors that are worn on the person of the soldier and or sensors that are positioned elsewhere. At step 2004, the input data set is pre-processed. At step 2006, the input data set is processed to extract key points (or features that are present in the input data set). At step 2008, a spatial location measure for the soldier is generated based on at least some of the key points. The spatial location measure may be a score that is generated based on the location of the soldier at a given time instant. In some respects, the spatial location may indicate whether (or the extent to which) the soldier is positioned at the location where he or she is expected to be at a particular time in a (training) mission. At step 2010, a pose measure for the soldier is generated based on at least some of the key points. At step 2012, a spatial orientation measure is generated for the soldier based on the key points. The spatial orientation measure may be a score that is generated based on the gaze of the soldier. The spatial orientation measure may indicate whether the soldier is paying sufficient attention to his or her surroundings (or a particular part of his or her surroundings) and/or whether a part of the soldier's surroundings invokes a particular cognitive response in the soldier. At step 2014, the measures identified at steps 2008-2012 are analyzed. Analyzing the measures may include: (i) generating a vector that is representative of the measures and (ii) classifying the signature with an AI model (e.g., a neural network) to determine the level of stress that is experienced by the soldier. The AI model may be the same or similar to the AI models discussed above.

Section 6: Before and After Scene Analysis

The techniques discussed above can be used for before and after scene analysis. Before and after scene analysis refers to comparing data that is describing a scene before the occurrence of an event and after the occurrence of the event. During the before event, a human user equipped with the acquisition devices, such as multi-imaging sensors and eye-tracker inspects a scene. The human user may impart their knowledge through visual cues such as fixations and gaze. The user may impart their knowledge through audio cues such as speech. The user may also impart their knowledge through written notes. All of these cues will be recorded in a machine-readable format and preprocessed, enhanced, and fused to obtain one or more fused elements. The output of data fusion can be of any dimension. Further, scene analysis is performed to describe the image content, the objects in it, location and relations between objects, and the events occurring in an image among other outputs. This process is achieved using a combination of classification, segmentation, and object detection modules. This analysis is stored on a memory device or in the cloud. Data about the scene, such as 3D reconstructions, annotations, multi-modal data are also stored in memory This information can also be viewed on mixed reality devices to perform application-specific operations. During the after-event analysis, the same process is repeated, but during scene analysis, the data collected from the previous event is extracted and compared to provide an after-event analysis.

Consider an example for training artificial intelligence models to create a database. Acquisition of data may be performed using one or more sensors, including but not limited to, multi-imaging sensors, 3D sensors, audio sensors, and human reaction capture sensors. Preprocessing step may be required after data acquisition. This is followed by a ClearVision enhancement step. If multiple sensors are used, then a multi-modal data fusion step may be used to fuse the data. Artificial intelligence-based scene analysis training is performed on the data. The results and data may be stored on a memory device or in the cloud. This database may contain raw data and trained artificial intelligence models.

Consider an example of a mixed reality based scene analysis system. This system is designed to work in a mixed reality world, instead of a purely real and physical world. The reality may be completely virtual or a combination of virtual and physical elements. The mixed reality systems may have human reaction capture systems, audio sensors, and inertial movement sensors. Scene analysis is performed in this mixed reality world. These steps may describe the world content, the objects in it, location and relations between objects, and the events occurring in an image among other outputs. This process is achieved using a combination of classification, segmentation, and object detection modules. This analysis is stored on a memory device or in the cloud. Data about the scene and results stored in memory This information can also be viewed on the same or other mixed reality devices.

In another example for a mixed reality scene analysis system using ClearVision, acquisition of data may be performed using one or more sensors, including but not limited to, multi-imaging sensors, 3D sensors, audio sensors, and human reaction capture sensors. A database consisting of artificial intelligence models trained using the present disclosure will be used. This is followed by preprocessing, ClearVision enhancement, and multi-modal fusion steps. Scene analysis is performed on the data using the trained artificial intelligence models. The results and data may be stored on a memory device or in the cloud. The results can also be viewed on mixed reality devices to perform application-specific operations.

Figure 23:
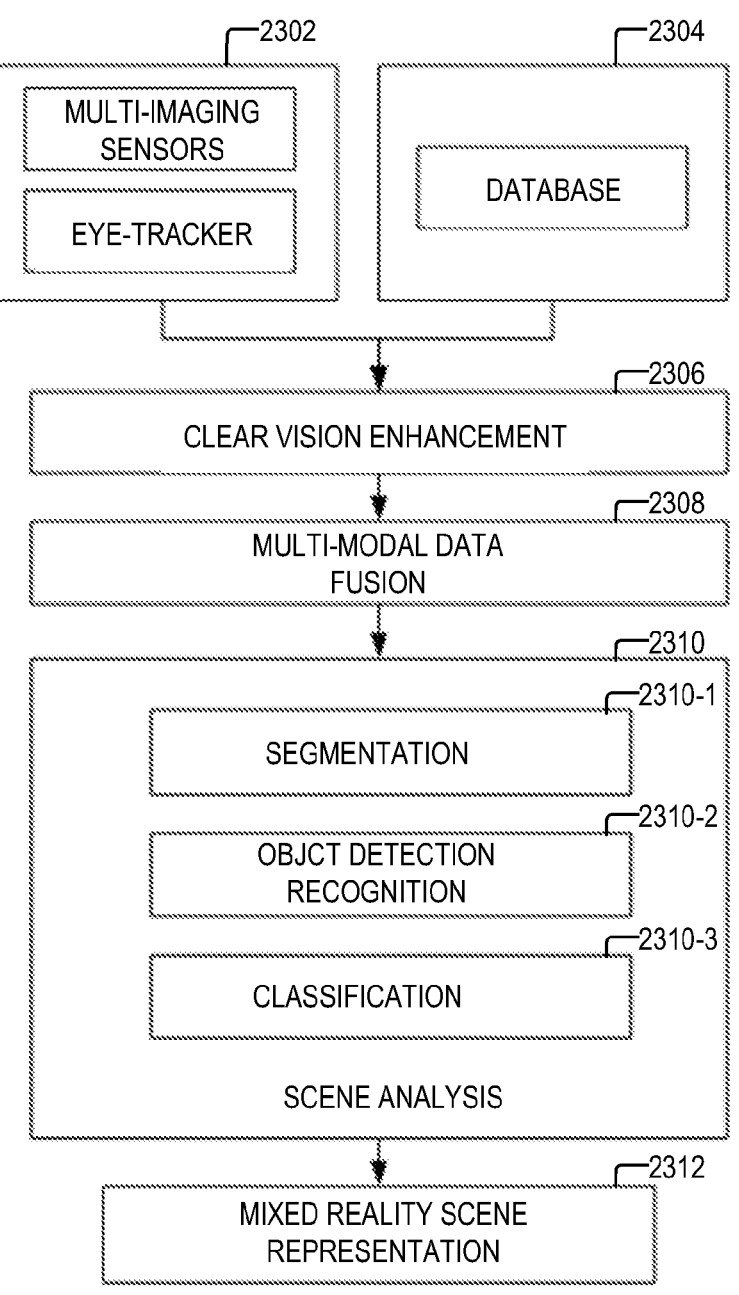
FIG. 23 is a flowchart of an example of a process, according to aspects of the disclosure.

FIG. 23 is a flowchart of an example of a process 2300 for generating a mixed reality scene representation. At step 2302, an input data set is received. The input data set may include data that is generated by one or more imaging sensors. The one or more imaging sensors may include sensors that are worn by a person while vising the site of a scene or one or more sensors that are otherwise arranged to monitor the scene. The input data set may further include eye tracker data for the user. The eye tracker data may identify the gaze position of the person while visiting the scene. At step 2304, additional data may be retrieved from the database. The additional data may include a map of the scene and/or any other suitable information that is associated with the scene. At step 2302 the data received at step 2302 and/or step 2304 is enhanced. At step 2308, the enhanced data is fused. At step 2310 one or more objects that are represented in the data (received at step 2302) are identified. Step 2310 may include steps 2310-1, 2310-2, and 2310-3. At step 2310-1, the fused data is segmented. At step 2310-2, the resulting data sets are processed using pattern recognition techniques to identify one or more objects that are represented in the data. At step 2310-3, the identified objects are classified using a computer vision technique. As a result of the classification, a label may be obtained that identifies a type or class of the object. At step 2312, a mixed reality scene representation of the scene is generated. The mixed reality scene representation may include: (i) a photo of the scene, (ii) labels (determined at step 2310-3) which identify the types of objects that are depicted in the photo, and which are superimposed of the photo, (iii) identification of any objects that are hot or have an abnormal signature, (iv) one or more markers that show where the gaze of the person was focused when the person was present at the scene. In some implementations, representations of a scene that are generated at different time instants may be compared to determine how the scene has changed following an event.

Section 7: Additional Applications

Figure 24:
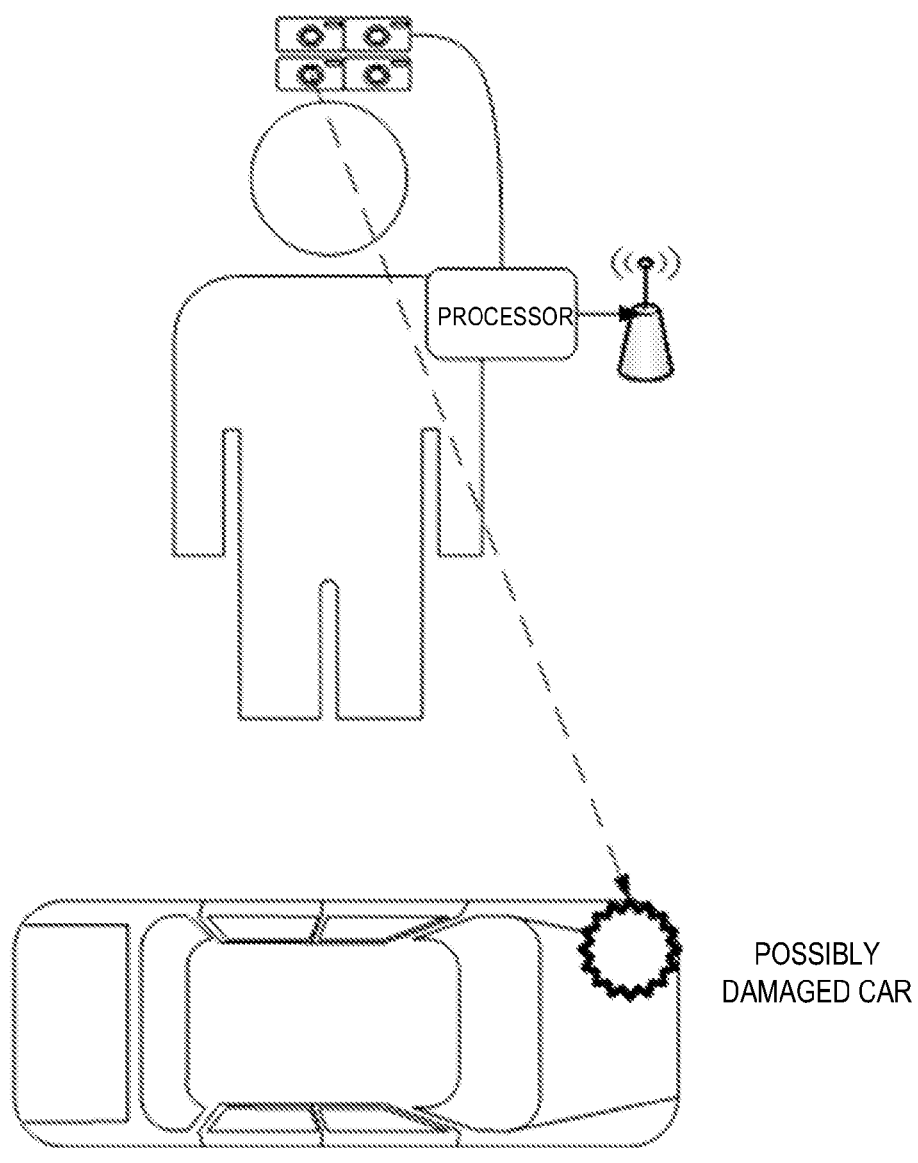
FIG. 24 is a diagram illustrating an example of the operation of a system, according to aspects of the disclosure.

FIG. 24 is a diagram illustrating an example of using the techniques presented throughout the disclosure to automatically estimate costs of damage. Using AI, images can be used to estimate the damage, compute repair costs at the first notice of loss (FNOL). The acquisition of data may be performed using one or more sensors, including but not limited to, multi-imaging sensors, 3D sensors, audio sensors, and human reaction capture sensors. A database consisting of artificial intelligence models trained using the present disclosure will be used. The AI is trained with large datasets containing automobile accidents images and estimates.

Figure 25:
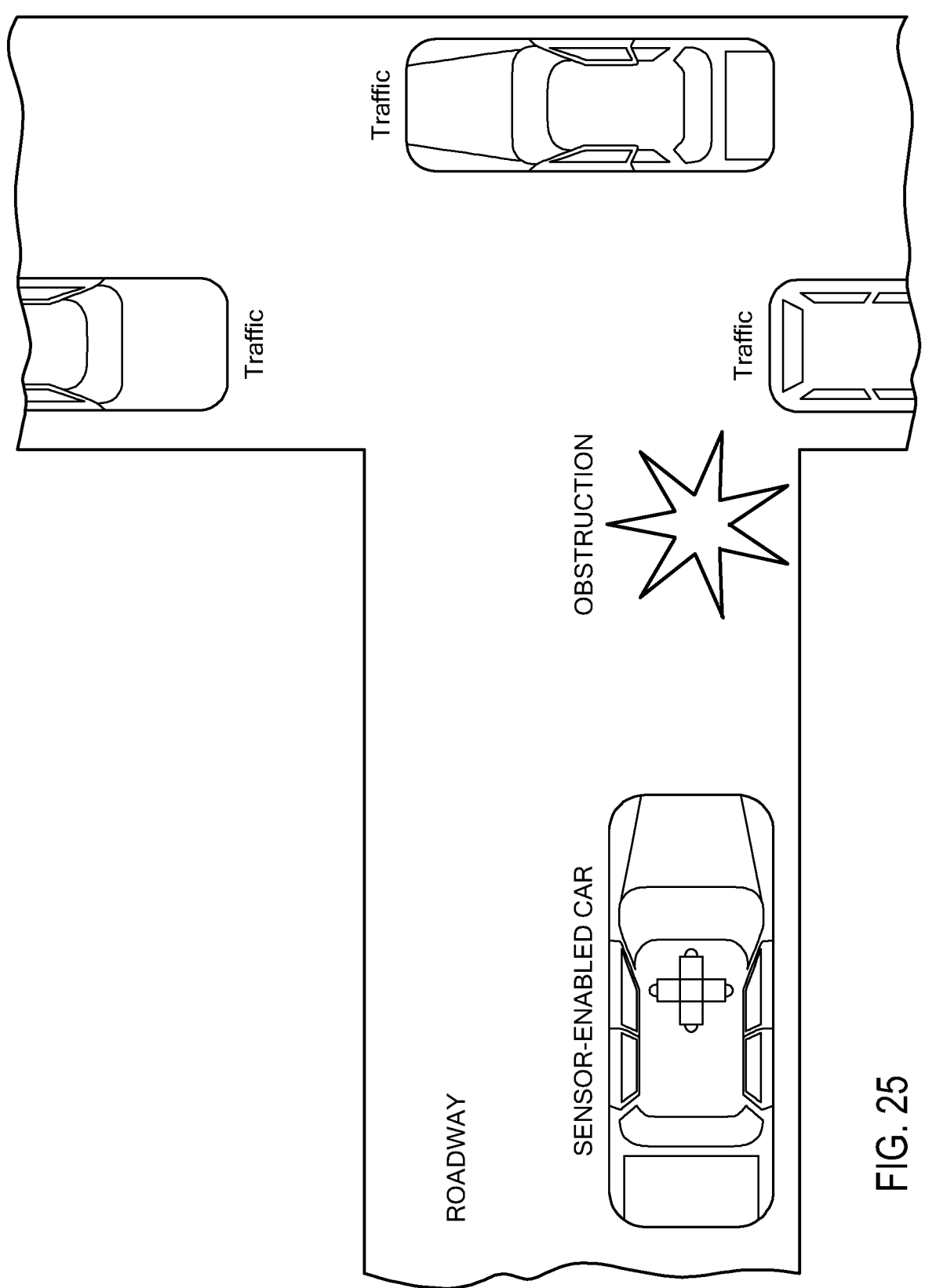
FIG. 25 is a diagram illustrating an example of the operation of a system, according to aspects of the disclosure.

FIG. 25 is a diagram illustrating an example of using the techniques presented throughout the disclosure to automatically analyze scenes for autonomous and manual vehicle navigation. By way of example, the data may be collected from one or more sensors and/acquired using the data acquisition methods described herein. The obstruction could be a physical obstruction such as a person, animal, or car in unfavorable weather conditions.

The term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Throughout the disclosure, various examples are provided that discuss the generation of fused data by combining the output of multiple sensors. Furthermore, throughout the disclosure, various examples are provided in which "at least a portion" of the fused data is classified. As used throughout the disclosure, the phrase "portion of fused data" is not limited to referring to only one of the data sets that are combined to form the fused data set. For example, in a situation in which a first data set and a second data set are combined to produce a fused data set, the phrase "portion of the fused data set" may refer to the combination of a first proper subset of the first data set and a second proper subset of the second data set.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary./.. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
obtaining a plurality of data sets, each of the plurality of data sets being generated, at least in part, by using a different one of a plurality of sensors, each of a plurality of sensors including a wearable sensor that is worn by a user or a sensor that is positioned at a same location as the user;
combining the plurality of data sets to produce a fused data set;
processing the fused data set to identify at least one of a performance of the user in completing a task, a cognitive load of the user, and/or one or more objects that are positioned at the same location as the user; and
outputting an indication of a state of the user based on an outcome of the processing,
wherein the plurality of data sets includes an image of a field of view of the user at a given time instant, and an indication of a gaze point of the user at the given time instant;
processing the fused data set includes identifying an object on which a gaze of the user is focused; and
outputting the indication of the state of the user includes outputting a marker that denotes the object on which the gaze of the user is focused, the marker being super-imposed on an image that shows a position of the user relative to the object.

2. The method of claim 1, wherein:
the plurality of data sets includes a gaze tracking data set for the user and an image that is being observed by the user during a period in which the gaze tracking data set is generated;
processing the fused data set includes classifying, with a neural network, at least a portion of the fused data set to identify a level of performance of the user in detecting a condition that is evident from the image; and
outputting the indication of the state of the user includes outputting an indication of the level of performance of the user.

3. The method of claim 1, wherein:
the plurality of data sets includes a gaze tracking data set for the user and plurality of images of a field of view of the user that are captured during a period in which the gaze tracking data set is generated;
processing the fused data set includes classifying, with a neural network, at least a portion of the fused data set to identify a level of performance of the user in fulfilling an objective; and
outputting the indication of the state of the user includes outputting an indication of the level of performance of the user.

4. The method of claim 1, wherein:
the plurality of data sets includes a data set that is generated by an Infrared (IR) imager and a visible range image of a field of view of the user;
processing the fused data set includes classifying, with a neural network, at least a portion of the fused data set as being associated with a gas leak; and
outputting the indication of the state of the user includes outputting an indication of a position of the user relative to the gas leak.

5. The method of claim 1, wherein:
the plurality of data sets includes a thermal image of a field of view of the user and a visible range image of the field of view of the user;
processing the fused data set includes classifying, with a neural network, at least a portion of the fused data set as being associated with a hot object; and
outputting the indication of the state of the user includes outputting an indication of a position of the user relative to the hot object.

6. The method of claim 1, wherein generating the fused data set includes bringing the plurality of data sets into a temporal alignment.

7. A system, comprising:
a memory; and
a processing circuitry that is operatively coupled to the memory, the processing circuitry being configured to perform the operations of:
obtaining a plurality of data sets, each of the plurality of data sets being generated, at least in part, by using a different one of a plurality of sensors, each of a plurality of sensors including a wearable sensor that is worn by a user or a sensor that is positioned at a same location as the user;
combining the plurality of data sets to produce a fused data set;
processing the fused data set to identify at least one of a performance of the user in completing a task, a cognitive load of the user, and/or one or more objects that are positioned at the same location as the user; and
outputting an indication of a state of the user based on an outcome of the processing,
wherein the plurality of data sets includes an image of a field of view of the user at a given time instant, and an indication of a gaze point of the user at the given time instant;
processing the fused data set includes identifying an object on which a gaze of the user is focused; and outputting the indication of the state of the user includes outputting a marker that denotes the object on which the gaze of the user is focused, the marker being super-imposed on an image that shows a position of the user relative to the object.

8. The system of claim 7, wherein:

the plurality of data sets includes a gaze tracking data set for the user and an image that is being observed by the user during a period in which the gaze tracking data set is generated;

processing the fused data set includes classifying, with a neural network, at least a portion of the fused data set to identify a level of performance of the user in detecting a condition that is evident from the image; and outputting the indication of the state of the user includes outputting an indication of the level of performance of the user.

9. The system of claim 7, wherein:

the plurality of data sets includes a gaze tracking data set for the user and plurality of images of a field of view of the user that are captured during a period in which the gaze tracking data set is generated;

processing the fused data set includes classifying, with a neural network, at least a portion of the fused data set to identify a level of performance of the user in fulfilling an objective; and outputting the indication of the state of the user includes outputting an indication of the level of performance of the user.

10. The system of claim 7, wherein:

the plurality of data sets includes a data set that is generated by an Infrared (IR) imager and a visible range image of a field of view of the user;

processing the fused data set includes classifying, with a neural network, at least a portion of the fused data set as being associated with a gas leak; and outputting the indication of the state of the user includes outputting an indication of a position of the user relative to the gas leak.

11. The system of claim 7, wherein:

the plurality of data sets includes a thermal image of a field of view of the user and a visible range image of the field of view of the user;

processing the fused data set includes classifying, with a neural network, at least a portion of the fused data set as being associated with a hot object; and outputting the indication of the state of the user includes outputting an indication of a position of the user relative to the hot object.

12. The system of claim 7, wherein generating the fused data set includes bringing the plurality of data sets into a temporal alignment.

13. A non-transitory computer-readable medium storing one or more processor-executable instructions, which when executed by at least one processor, cause the at least one processor to perform the operations of:

obtaining a plurality of data sets, each of the plurality of data sets being generated, at least in part, by using a different one of a plurality of sensors, each of a plurality of sensors including a wearable sensor that is worn by a user or a sensor that is positioned at a same location as the user;

combining the plurality of data sets to produce a fused data set;

processing the fused data set to identify at least one of a performance of the user in completing a task, a cognitive load of the user, and/or one or more objects that are positioned at the same location as the user; and outputting an indication of a state of the user based on an outcome of the processing, wherein the plurality of data sets includes an image of a field of view of the user at a given time instant, and an indication of a gaze point of the user at the given time instant;

processing the fused data set includes identifying an object on which a gaze of the user is focused; and outputting the indication of the state of the user includes outputting a marker that denotes the object on which the gaze of the user is focused, the marker being super-imposed on an image that shows a position of the user relative to the object.

14. The non-transitory computer-readable medium of claim 13, wherein:

the plurality of data sets includes a gaze tracking data set for the user and an image that is being observed by the user during a period in which the gaze tracking data set is generated;

processing the fused data set includes classifying, with a neural network, at least a portion of the fused data set to identify a level of performance of the user in detecting a condition that is evident from the image; and outputting the indication of the state of the user includes outputting an indication of the level of performance of the user.

15. The non-transitory computer-readable medium of claim 13, wherein:

the plurality of data sets includes a gaze tracking data set for the user and plurality of images of a field of view of the user that are captured during a period in which the gaze tracking data set is generated;

processing the fused data set includes classifying, with a neural network, at least a portion of the fused data set to identify a level of performance of the user in fulfilling an objective; and outputting the indication of the state of the user includes outputting an indication of the level of performance of the user.

16. The non-transitory computer-readable medium of claim 13, wherein:

the plurality of data sets includes a data set that is generated by an Infrared (IR) imager and a visible range image of a field of view of the user;

processing the fused data set includes classifying, with a neural network, at least a portion of the fused data set as being associated with a gas leak; and outputting the indication of the state of the user includes outputting an indication of a position of the user relative to the gas leak.

17. The non-transitory computer-readable medium of claim 13, wherein:

the plurality of data sets includes a thermal image of a field of view of the user and a visible range image of the field of view of the user;

processing the fused data set includes classifying, with a neural network, at least a portion of the fused data set as being associated with a hot object; and outputting the indication of the state of the user includes outputting an indication of a position of the user relative to the hot object.

* * * * *